US008277767B2

(12) United States Patent
Ariya-Far

(10) Patent No.: US 8,277,767 B2
(45) Date of Patent: Oct. 2, 2012

(54) METHOD AND SYSTEM FOR ADSORBING POLLUTANTS AND/OR CONTAMINANTS

(76) Inventor: Parisa A. Ariya-Far, Hampstead (CA)

(*) Notice: Subject to any disclaimer, the term of this patent is extended or adjusted under 35 U.S.C. 154(b) by 0 days.

(21) Appl. No.: 12/938,563

(22) Filed: Nov. 3, 2010

(65) Prior Publication Data

US 2011/0158872 A1 Jun. 30, 2011

Related U.S. Application Data

(60) Provisional application No. 61/257,620, filed on Nov. 3, 2009.

(51) Int. Cl.
*B01D 15/00* (2006.01)
*B01D 53/34* (2006.01)
*B01D 53/46* (2006.01)
*B01D 53/74* (2006.01)
*C02F 1/00* (2006.01)

(52) U.S. Cl. ..... 423/210; 423/247; 423/230; 423/239.1; 423/235; 423/245.1; 423/219; 422/129; 422/168; 422/177; 422/187; 210/600; 210/660; 210/749

(58) Field of Classification Search .................. 423/210, 423/247, 230, 239.1, 235, 245.1, 219; 422/129, 422/168, 177, 187; 210/600, 749, 660
See application file for complete search history.

(56) References Cited

U.S. PATENT DOCUMENTS 3,927,525 A * 12/1975 Jacobs ............................ 60/301

OTHER PUBLICATIONS

Yang, S. et al., Nanosized Cation-Deficient Fe-Tl Spinel: A Novel Magnetic Sorbent for Elemental Mercury Capture from Flue Gas, ACS Appl. Mater. Interfaces 2011, 3, 209-217.

Dong, J. et al., "Magnetic Multi-Functional Nano Composites for Environmental Applications", Adv. Funct. Mater 2009, 19, 1268-1275.

Lineberry, Q.J. et al., "Mercury Capture from Flue Gas Using Palladium Nanoparticle-Decorated Substrates as Injected Sorbent", Energy & Fuels 2009, 23, 1512-1617.

Liu, Y. et al., "Novel Regenerable Sorbent for Mercury Capture from Flue Gases of Coal-Fired Power Plant", Environ. Sci. Technol. 2008, 42, 6205-6210.

Dou, B. and Chen, H., "Removal of toxic mercury(II) from aquatic solutions by synthesized TiO2 nanoparticles", Desalination 269 (2011) 260-265.

Baltrusaitis, J. et al., "Sulfur Dioxide Adsorption on TiO2 Nanoparticles: Influence of Particle Size, Coadsorbates, Sample Pretreatment, and Light on Surface Speciation and Surface Coverage", J. Phys. Chem. C 2011, 115, 492-500.

Snider, G. and Ariya, P., "Photo-catalytic oxidation reaction of gaseous mercury over titanium dioxide nanoparticle surfaces", Chemical Physics Letters 491 (2010) 23-28.

Worathanakul, P. et al., "Evaluation of Nanostructured Sorbents in Differential Bed Reactors for Elemental Mercury Capture", Environmental Engineering Science, 2008, 25, 1061-1070.

(Continued)

*Primary Examiner* — Timothy Vanoy

(74) *Attorney, Agent, or Firm* — Mirick, O'Connell, DeMallie & Louge, LLP

(57) ABSTRACT

The present invention relates to a method and a multi-component system for adsorbing contaminants and/or pollutants from a contaminated hot fluid by using a turbulent air stream, to adiabatically cool the temperature of the fluid, in association with one or more adsorbents. The system of the present invention can also be coupled to a recovery and recycling unit to recover and recycle the contaminant and/or pollutant and the adsorbent material.

22 Claims, 24 Drawing Sheets

OTHER PUBLICATIONS

Yamaguchi, A. et al., "Mercury oxidation by copper oxides in combustion flue gases", Powder Technology 180 (2008) 222-226.
Wiatrowski, H.A. et al., "Reduction of Hg(II) to Hg(0) by Magnetite", Environ. Sci. Technol. 2009, 43, 5307-5313.
Meyer, D.E. et al., "Examination of Sulfur-Functionalized, Copper-Doped Iron Nanoparticles for Vapor-Phase Mercury Capture in Entrained-Flow and Fixed-Bed Systems", Energy & Fuels 2007, 21, 2688-2697.
Wu, Z. et al., "Photocatalytic oxidation of nitric oxide with immobilized titanium dioxide films synthesized by hydrothermal method", Journal of Hazardous Materials 151 (2008) 17-25.
Gao, X. et al., "Adsorption and reduction of NO2 over activated carbon at low temperature", Fuel Processing Technology 92 (2011) 139-146.
Desikusumastuti, A. et al., "Particle-Size-Dependent Interaction of NO2 with Pd Nanoparticles Supported on Model Nox Storage Materials", J. Phys. Chem. C 2009, 113, 9755-9764.
Bashkova S. et al., "Effect of silver nanoparticles deposited on micro/mesoporous activated carbons on retention of NOx at room temperature", Journal of Colloid and Interface Science 354 (2011) 331-340.
Chin, S. et al., "Preparation of TiO2 ultrafine nanopowder with large surface area and its photocatalytic activity for gaseous nitrogen oxides", Powder Technology 206 (2011) 306-311.
Rodriguez, J.A. et al., "Activation of Au nanoparticles on oxide surfaces: reaction of SO2 with Au/MgO(1 0 0)", Chemical Physics Letters 378 (2003) 526-532.
Rodriguez, J.A. et al., "Destruction of SO2 on Au and Cu Nanoparticles Dispersed on MgO(100) and CeO2(111)", J. Phys. Chem. A 2010, 114, 3802-3810.
Baltrusaitis, J. et al., "Carbon dioxide adsorption on oxide nanoparticle surfaces", Chem. Eng. J. (2011), doi: 10.1016/j.cej.2010.12.041.
Li, L. et al., "MgA12O4 Spinel-Stabilized Calcium Oxide Adsorbents with Improved Durability for High-Temperature CO2 Capture", Energy Fuels 2010, 24, 3698-3703.
Chen, C.S. et al., "Carbon Dioxide Hydrogenation on Cu Nanoparticles", J. Phys. Chem. C 2010, 114, 15021-15028.
Shipley, H.J. et al., "Adsorption of Arsenic to Magnetite Nanoparticles: Effect of Particle Concentration, pH, Ionic Strength, and Temperature", Environmental Toxicology and Chemistry 2009, vol. 28, No. 3, 509-515.
Nassar, N.N. and Pereira-Almao, P., Capturing H2S(g) by In Situ-Prepared Ultradispersed Metal Oxide Particles in an Oilsand-Packed Bed Column, Energy Fuels 2010, 24, 5903-5906.
Nassar, N.N., "Rapid removal and recovery of Pb(II) from wastewater by magnetic nanoadsorbents", Journal of Hazardous Materials 184 (2010) 538-546.
Takei, T. et al., "Preparation of ultrafine magnetite and its oxygen adsorption", Materials Science and Engineering B 173 (2010) 84-88.
Lopez De Arroyabe Loyo, R. et al., "Immobilization of Selenite on Fe3O4 and Fe/Fe3C Ultrasmall Particles", Environ. Sci. Technol. 2008, 42, 2451-2456.

* cited by examiner (a)

(b)

METHOD AND SYSTEM FOR ADSORBING POLLUTANTS AND/OR CONTAMINANTS

RELATED APPLICATIONS

This patent application claims the benefit of U.S. Patent Application No. 61/257,620 filed on Nov. 3, 2009, entitled, "METHOD AND SYSTEM FOR ADSORBING POLLUTANTS."

FIELD OF THE INVENTION

The present invention is directed to a multi-component system and methods for adsorbing contaminants and/or pollutants from a contaminated fluid and more particularly to a multi-component system and method for increasing the efficiency of contaminants and/or pollutants adsorption from a contaminated hot fluid.

BACKGROUND OF THE INVENTION

Air pollution is a major environmental challenge causing tangible health, economic and climatic effects. In many developing regions of the world, emissions are increasing rapidly and are set to rise dramatically in the next century if the conventional development path is followed. Industrialized countries take these concerns more seriously and concerted efforts are made to reduce air pollution.

Mercury is a toxic environmental pollutant that is among the most highly bio-magnified and bio-accumulated trace metal in the human food chain. Mercury comes from a range of natural sources such as volcanoes, soils, undersea vents, mercury-rich geological zones and forest fires, as well as from fresh water lakes, rivers and the oceans. However, human activity has increased the amount of mercury in the environment in several ways, including through a variety of combustion and industrial processes like coal-fired power generation, metal mining and smelting and waste incineration.

Carbon dioxide ($CO_2$), methane ($CH_4$), nitrous oxide ($N_2O$) and various halocarbons are known to be important participant gases to greenhouse emissions. Concerns are raised also about other pollutants and green house gas co-pollutants such as nitrogen oxides (NOx), sulfur oxides (SOx), volatile organic compounds (VOC) as well as particulate matter (aerosols), as sources of grave environmental problems.

Several techniques are known to reduce the emission of these pollutants. Adsorption is one technique used, but most known adsorbents are efficient at a relatively low temperature and become often less useful when used at high temperature, when the undesired compounds are released.

Therefore, it would be highly desirable to develop a method and an apparatus for adsorbing contaminants and/or pollutants from a hot contaminated fluid which will improve the efficiency of the adsorbent by reducing the temperature of the contaminated fluid.

It is also clear that the pollutants are not only required to be merely removed from a fluid stream, but also need to be recycled. However the recycling techniques should be energetically efficient with minimum adverse impacts on the environment.

Hence, a complete system and method, which utilize a minimum of energy, involving (a) one or more adsorbent interface(s), (b) an efficient cooling of the polluted fluid, (c) a recycling-reusage of adsorbents, and (d) a recovery of useful materials from waste, are desirable to meet the challenges of minimizing the adverse impacts on the environment.

SUMMARY OF THE INVENTION

According to one aspect of the present invention, a method for adsorbing a contaminant/pollutant from a hot fluid is provided. The method comprises a mixing step wherein a cooling turbulent flow is coupled to the fluid; and an adsorption step wherein the cooling turbulent flow coupled to the fluid is contacted with an adsorbent adapted to form a complex (including physisorbed or chemisorbed or chemical reactions) with the contaminant/pollutant to be adsorbed. The present invention also describes a method for increasing contaminant or pollutant adsorption while contacting a contaminated fluid with an adsorbent material. In other words, the method of the present invention comprises the step of coupling a turbulent stream with said fluid, thereby decreasing its temperature and increasing the efficiency of said adsorbent material.

More particularly, the present invention provides a method and a multi-component system involving the following four characteristics:

(a) An assembly and selection of nano-, micro- and macro-particles in homogeneous and/or heterogeneous configurations that are used to adsorb single and/or multiple pollutants from a hot fluid stream (gas/liquid/multiphase). In a preferred embodiment, the particles are naturally founded;

(b) The coupling of an adsorbent interface with a turbulence cooling unit to reduce the initial temperature of the hot fluid stream, which association will allow an efficient adsorption of the pollutant or contaminant;

(c) A recovery and recycling unit, run by reusable energy, can be coupled to the adsorbent interface to regenerate the nano- or macro-interface, separate pollutants and recover pure compounds at each electrodes; and (d) The extra heat produced by the turbulence cooling unit can be used for further purification of waste.

It will be understood that these four steps can be used in concert or individually depending on the application. The Applicant has demonstrated herein that these interfaces are very efficient for pollutants such as volatile and semi-volatile organic compounds, CO2, NOx, SOx, pollutant intermediates, aerosols including bio-organic aerosols such as airborne microorganisms, and trace metals such as mercury. Furthermore, it has also been demonstrated that, by immobilizing nano- or macroparticles on porous surface such as (but not limited to) cellulose beads, it was possible to make, for example, facial masks and filters for in-door air pollution that have been tested to be very efficient.

In one aspect, the present invention describes a method for adsorbing a contaminant or pollutant from a fluid, said method comprising the steps of a) mixing a cool turbulent air flow from a turbulence cooling unit with the fluid to produce a mixed fluid containing the contaminant or pollutant; and b) adsorbing the contaminant or pollutant present in the mixed fluid by passing said mixed fluid through an adsorbent material adapted to form a complex, or chemically react with, or adsorb said contaminant or pollutant from said fluid.

In accordance with the present invention, the fluid can be selected from a gas, a liquid or a multiphase.

In a preferred embodiment, method of the present invention further comprises the step of recycling and recovering the contaminant or pollutant and the adsorbent material to render the adsorbent available for further use in the adsorption step. The recycling and recovering step can comprise an electrochemical process, a cyclonic separation and/or a magnetic separation process, a desorption process, or a thermal process.

In another embodiment, the extra heat produced by the turbulence cooling unit is recycled as a source of energy for the recycling and recovering step as the electrochemical or thermal process.

In one aspect, the method in accordance with the present invention is suitable for use with contaminants/pollutants such as, without limitation, metals including heavy metals (e.g. mercury, lead, arsenic, cadmium, zinc, and the like), carbon oxides (CO and $CO_2$), nitrogen oxides (e.g. $NO_x$, NO, $NO_2$, $N_2O$, and the like), volatile organic compound (VOC), $O_3$ and other oxidants (e.g. $HO_2$, $RO_2$, and the like), aerosols and bioparticles. The term "bioparticles or bioaerosols" is intended to particles such as, but not limited to, virus, bacteria, fungi, algae and biofilms, as well as clusters of bioorganic matter and semi-volatile organic compounds and macromolecules.

Adsorbent material of the present invention comprises a plurality of nanoparticles, microparticles or macroparticles for adsorbing the contaminant or pollutant from the fluid to be decontaminated or depolluted. The adsorbent material can also comprise particles of multiple nature for adsorbing more than one contaminant or pollutant. For example, the adsorbent material comprises gold or gold-coated particles when the contaminant is Hg. Examples or adsorbents of the present invention comprises iron oxide or iron-oxide coated magnetic particles, activated carbon powder or carbon powder coated particles, alumina or alumina coated particles, titanium dioxide or titanium dioxide coated particles, sulfur or sulfur coated particles, seasalt particles, sulfate particles. The adsorbent of the present invention can also comprise a carbon material having macroparticles, microparticles or nanoparticles incorporated thereto. These macroparticles, microparticles or nanoparticles are made of, or covered with, a material adapted to form a compound or complex with said contaminants or pollutants. The carbon material can comprise at least one of graphitized carbon fibers, graphitic flakes and graphitic fluoride fibers. The macroparticles, microparticles or nanoparticles are made of, or covered with gold or sulfur and wherein said contaminant or pollutant is mercury and with metal or metal oxides-containing wherein said contaminant or pollutant is volatile organic or bioaerosol compound. Alternatively, the macroparticles, microparticles or nanoparticles can be made of, or covered with metal containing seasalt, sulfate aerosols, sulfur-containing, organic and bioorganic materials and attached to a surface comprising filters or beads. In a preferred embodiment, the turbulence cooling unit described in the present invention can be coupled to a green adsorbent interface generated by environmental and atmospheric found aerosols. Furthermore, when the system of the present invention is coupled to a recycling and recovery unit supplied by a green energy, the system of the present invention is entirely green and is in line with the principles of environmental protection. In a preferred embodiment, the nano-, micro- or macroparticles of the present invention are attached or fixed on a surface such as cellulose or glass beads in order to avoid uncontrolled dispersion of the particles in the fluid stream.

In another embodiment of the present invention, where the contaminant or pollutant is a volatile organic compound, the method further comprises a multi-stage photolysis step after the mixing step, wherein the byproducts resulting from said photolysis step are adsorbed by said adsorbent material during step (b). In a preferred embodiment, the photolysis step is operated using renewable energy as solar energy.

Since one aim of the present invention is to provide a green design, it is preferred that the photolysis step is carried out using renewable energy such as, but not limited to solar energy. The adsorbed organic containing compounds as well as adsorbents can be recovered using electrochemical methods, or thermal desorption using the excess heat removal from a turbulence cooling unit, which is basically a heat exchanger. The excess temperature in heat exchangers are generally not positively regarded, however, we herein use this excess thermal energy to desorb/recover/purify the waste.

In a further embodiment of the present invention, the method further comprises a contaminant or pollutant recovery step after the adsorption step, wherein the contaminant/pollutant is recovered from the adsorbent and the adsorbent is rendered available for further use by recycling and recovery.

The present invention further comprises a depollution or decontamination system for adsorbing a pollutant or a contaminant from a pollutant- or contaminant-containing fluid, comprising a fluid input chamber having an inlet and an outlet. The fluid input chamber being adapted to receive and carry a fluid to be depolluted or decontaminated. A turbulence flow chamber having an inlet and an outlet, and comprising a plurality of turbulators. The turbulence flow chamber is connected to the outlet of the fluid input chamber and is adapted to generate a cool turbulent air flow. A mixing zone positioned at a point of junction where the fluid to be depolluted or decontaminated is mixed with the cool turburlent air flow to produce a mixed pollutant- or contaminant-containing fluid. The system further comprises a fluid output chamber comprising an adsorbent material. In function, the mixed pollutant- or contaminant-containing fluid passes through the adsorbent material of the fluid output chamber to be depolluted or decontaminated.

The pollutant- or contaminant-containing fluid used in the context of the present invention is hot and the mixed pollutant- or contaminant-containing fluid is cooler than the temperature of the pollutant- or contaminant-containing fluid at an entrance of the system.

In another embodiment, the system further comprises a plurality of drying agent cells. In another embodiment, the system further comprises a photolysis device or system. In another embodiment, the system further comprises a recycling and recovery device or system. In one embodiment, the recycling and recovery device or system comprises an electrochemical cell connected to an ouput end of the fluid output chamber. In another embodiment, the system further comprises a thermal treatment device or system to an ouput end of the fluid output chamber. In another embodiment, the thermal treatment device or system uses excess heat generated by the turbulence cooling unit. In another embodiment, the system of the present invention further comprises a detector for detecting an amount of pollutant or contaminant present in an output flow.

BRIEF DESCRIPTION OF THE DRAWINGS

Further aspects and advantages of the present invention will be apparent with reference to the description in association with the following in which:

FIG. 2(*b*) illustrates the NO concentration relative to the concentration at room temperature $T_x$=27° C. as a function of temperature for different adsorbing material;

FIG. 4(*b*) demonstrates the NO, $NO_2$ and $NO_x$ concentration at room temperature $T_x$=27° C., as a function of entrance gas temperature ($f_{turb}$=140 L/min);

FIG. 14(*b*) illustrates that the nano-interfaces can decrease the total emission of $CO_2$ in bioreactors and thus, decreasing the precursors of $CO_2$;

FIG. 17(*b*) illustrates the VOC efficiency using nano- and macroparticles of iron oxides. The system was tested for air circulation filters and facial masks;

FIG. 20(*b*) is a transmission electron microscopy of regenerated and reused iron oxides particles. Note that the particle size and crystalline structures have not been altered during the regeneration processes.

DETAILED DESCRIPTION OF THE INVENTION

Definitions

Figure 1:
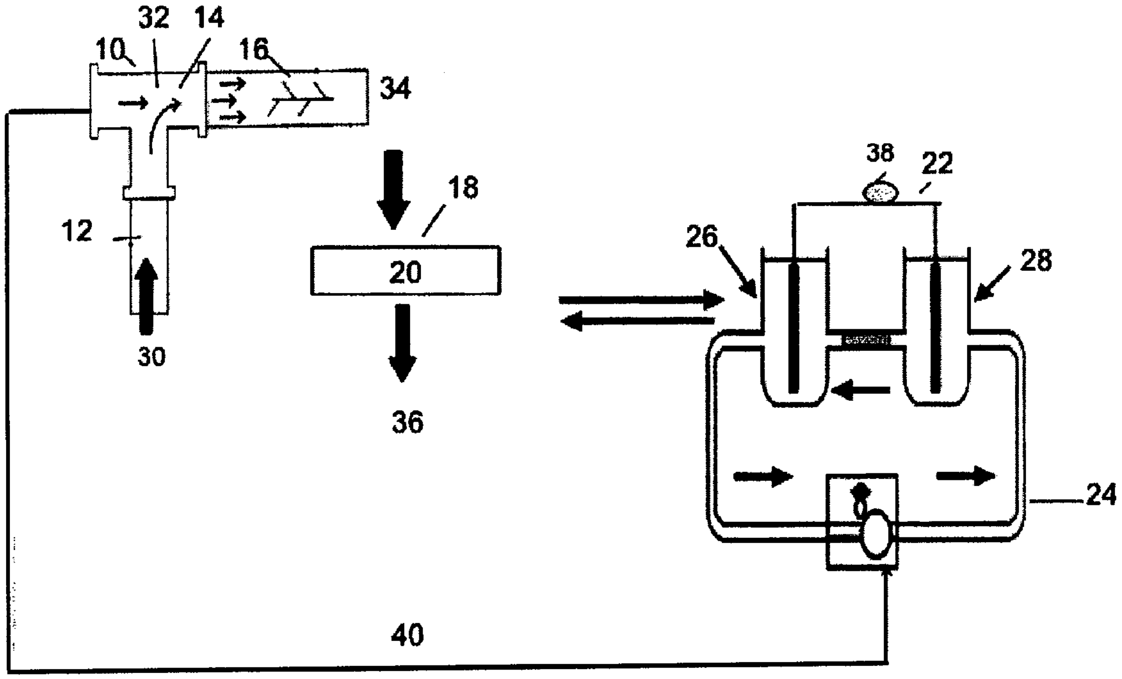
FIG. 1 is a schematic representation of the experimental system including the cooling device and recycling steps (each element of the system can be deployed separately, depending on specific industrial usage)

All technical and scientific terms used herein have the same meaning as commonly understood by one of ordinary skill in the art to which the invention pertains. For convenience, the meaning of certain terms and phrases used herein are provided below.

To the extent the definitions of terms in the publications, patents, and patent applications incorporated herein by reference are contrary to the definitions set forth in this specification, the definitions in this specification take precedence. The section headings used herein are for organizational purposes only, and are not to be construed as limiting the subject matter disclosed.

The term "contaminant" refers to a substance that contaminates, an impurity or any material of an extraneous nature associated with a chemical, a pharmaceutical preparation, a physiologic principle, or an infectious agent.

The term "pollutant" refers to an alteration of a natural environment producing a condition that is harmful to living beings, and it can be human made, but at the same time natural products can also be pollutants.

The term "turbulent flow" refers to a flow in which the fluid undergoes irregular fluctuations, or mixing, and in which the speed of the fluid at a point is continuously undergoing changes in both magnitude and direction. A turbulent flow is generally characterized by having a Reynolds number in the range of about 2300 to about 5000 and more of about 4000 or more.

The term "adsorption" refers to the process that occurs when a gas, liquid, solid, multiphase compound accumulates on the surface of a solid or a liquid or a multiphase (adsorbent), forming a film of molecules or atoms (the adsorbate).

DESCRIPTION

The present invention relates to a method and multi-component system for adsorbing contaminants and/or pollutants from a contaminated hot fluid by using a turbulent air stream, to adiabatically cool the temperature of the fluid, in association with one or more adsorbent.

It is provided herein a new method and multi-component system for adsorbing contaminants/pollutants from a hot contaminated fluid or a hot contaminated gas stream by using a turbulent air stream, to adiabatically cool the temperature of the fluid or the hot gas stream, in association with one or more sorbent(s) or adsorbent(s). The sorbent or adsorbent of the present invention is made of a material suitable to form a complex (e.g. physisorption or chemisorption or chemical reactions) with the contaminant and/or pollutant to be adsorbed. In a further embodiment, the method and system of the present invention further comprise a contaminant/pollutant recovery and recycling step after the adsorption step. The recovery and recycling unit of the present invention comprises a desorption system (including thermal desorption and/or electrochemical cell (run by using, for example, renewable energy)) to recover the separated adsorbents and adsorbates (see FIG. 1). For example, when the contaminant/pollutant is a metallic compound, the recovery step may be, for example, an electro-chemical step. When the contaminant/pollutant is gaseous, the recovery step may be a thermal desorption step as well as an electro-chemical step. The person skilled in the art could easily envision alternative recovery and recycling step as these techniques all well known in the art.

The method and depollution or decontamination system of the present invention is suitable for use in the recovery of contaminants/pollutants such as, without limitation, metals including heavy metals (e.g. mercury, lead, arsenic, cadmium, zinc, and the like), carbon oxides (CO and $CO_2$), nitrogen oxides (e.g. $NO_x$, NO, $NO_2$, $N_2O$, and the like), volatile organic compound (VOC), $O_3$ and other oxidants (e.g. $HO_2$, $RO_2$, and the like), aerosols and bioparticles. The term “bioparticles or bioaerosols” is intended to particles such as, but not limited to, virus, bacteria, fungi, algae and biofilms, as well as clusters of bioorganic matter and semi-volatile organic compounds and macromolecules.

The fluid containing the contaminants/pollutants is selected from a gas, a liquid or a multiphase.

The sorbent or adsorbent of the present invention may be any suitable macroparticles, microparticles and/or nanoparticles known in the art for adsorbing contaminants/pollutants present in a hot fluid or a hot gas stream. The particles can be of different nature for adsorbing more than one contaminants/pollutants. Examples of suitable adsorbents used in the present invention are metals and metal oxides (e.g., $Ti_2O_3$, $TiO_2$, $Fe_2O_3$, ZnO, MnO, and the likes), natural clay minerals, sulfur-containing organic and inorganic compounds, sea-salt particles, and organic films for the removal of volatile organic compounds, NOx, $SO_x$, $CO_2$, aerosols and bioaerosols, as well as trace metals such as mercury. In another embodiment, the macroparticles, microparticles and/or nanoparticles are immobilized on a porous surface such as, but not limited to, cellulose. This type of association is used in the confection of facial masks and fluid-circulation units (such as indoor-air circulation and aqueous waste treatment). In a further embodiment, the adsorbent comprises gold or gold-coated particles or nanoparticles for adsorbing mercury. In a preferred embodiment, the adsorbents are gold, sulfur-containing compounds, and single or mixed metals and metal oxides. Others examples of adsorbents suitable for use in the method and system of the present invention comprise iron oxide or iron-oxide coated magnetic particles, activated carbon powder or carbon powder coated particles, alumina or alumina coated particles, titanium dioxide or titanium dioxide coated particles, sulfur or sulfur coated-particles, sea salt particles and sulfate particles. A person skilled in the art would have no difficulty in selecting an appropriate adsorbent or sorbent in function of the contaminants/pollutants to be adsorbed in a hot fluid or hot gas stream.

The sorbent or adsorbent of the present invention can also comprise a carbon material having macroparticles, microparticles or nanoparticles incorporated thereto which macroparticles, microparticles or nanoparticles are being made of, or are covered with, a material adapted to form a compound or complex with contaminants or pollutants from a fluid. The carbon material comprises at least one member selected from the group consisting of graphitized carbon fibers, graphitic flakes and graphitic fluoride fibers.

The preparation of the sorbent and adsorbent interface used in the contaminant/pollutant adsorption system of the present invention, unless some modifications are done, is known in the art and will not be described in further details.

Aerosols are defined as condensed matter or particles suspended in the air. In the context of the present invention, the aerosols are particles ranging from nano-scale to micro-scale. In the present patent application, particles of less than one micron are defined as nanoparticles or nanoaerosols. Particles above one micron are defined as microparticles or microaerosols. Further, the coagulation of various sizes of particles are defined as macroparticles or macroaerosols.

A method and a system have been developed, making use of turbulent air flow, to adiabatically cool a hot fluid or a hot gas stream. It has been found that the temperature of a hot stream of air can be lowered to below 20% of its original temperature under experimental conditions herein used. It is noteworthy as several physical parameters control the mixing of turbulent and main fluid stream, one can design specific temperature drop based on the industrial requirements. This technology possesses the advantage of requiring no additional energy when the technology is used with moving objects or when the technology is used with stationary objects. Furthermore, one can minimize the energy demand by using renewable energies such as solar energy in order to provide a green design.

The present invention demonstrates that using a cool turbulent air flow not only achieves dramatic cooling of a hot fluid or a hot gas stream (from, for example, 400° C. to below 60° C.), but also that the decrease in temperature of the exhaust fluid/gas improve significantly the adsorption efficiency on low-cost adsorbents, as alumina adsorbents. As known in the art, many types of adsorbents have a reduced efficiency at high temperature and the method and system of the present invention allow a reduction of temperature that permits an efficient use of these adsorbents. The results shown herein are only illustrative of some possibilities of the method and system of the present invention. It will be understood that all uses of an adsorbent at high temperature will benefit from the method of the present invention since the efficiency of the adsorbent is improved by the reduction of temperature resulting from the cool turbulent air flow.

In the present invention, a temperature range from approximately 50-500° C. has been studied. By decreasing the temperature to temperatures of less or equal to, for example, 60° C., one would increase the adsorption very efficiently. Indeed, it has been demonstrated that, at this temperature, nearly all the pollutants/contaminants can be removed from a hot fluid (up to 100% removal). Indeed, the major challenge against adsorption processes is that most of them are very inefficient at high temperatures. Therefore, using turbulence cooling of fluid (as air or liquid media), one can decrease the temperature of the fluid containing pollutants/contaminants so that the majority of adsorbents become much more efficient in adsorbing pollutants/contaminants. Without this cooling setup, the adsorbent efficiency is generally highest at low temperatures such as less than approximately 60° C., but at higher temperatures, even as high as 100° C., the adsorbent interface is hardly capable of adsorbing any pollutant/contaminant (less than 10% removal). The present invention provides a novel method and system to make any adsorbent to work in an optimal manner. The present invention has also demonstrated that the use of adsorbents containing natural nano- and macroparticles in combination with the turbulence cooling can provide a very efficient interface for the removal of pollutants/contaminants when compared, for example, with other widely used adsorbent materials as alumina or zeolite.

A general representation of the contaminant/pollutant adsorption system of the present invention is shown in FIG. 1. The turbulence cooling device or unit (10) comprises a fluid input chamber (12), a turbulence flow chamber (14) comprising a plurality of turbulators for the production of a cool turbulent air flow, a mixing zone (16) and a fluid output chamber (18) comprising an adsorbent material (20) including, but not limited to, nano- or macromolecule adsorbent interfaces in the form of sieves, filters, grids, films, and the likes. The person skilled in the art will know which type of turbulators has to be chosen in relation to the cool turbulent air flow to produce. The turbulence flow chamber (14) is connected to a compressor known in the art and efficient in the production of a cool turbulent air flow. In an alternative embodiment, the mixing zone (16) is not a distinct part of the system, but presents only the junction between the fluid input chamber (12), the turbulence flow chamber (14) and the fluid output chamber (18). In another embodiment, the adsorbent interface (20) of the system (10) is coupled to a recycling and recovery device or system (22). In an embodiment, the recycling and recovery device or system (22) comprises a desorption system for the regeneration of the adsorbent interface and the separation of pollutants. The desorption system of the present invention can be an electrochemical cell or an electrolysis unit (24) (with a cathode (26) and an anode (28) as shown in FIG. 1) connected to the output end of the fluid output chamber (18). In a further embodiment, the desorption system (22) comprises a thermal treatment device or system (not shown) connected to the output end of the fluid output chamber (18). Furthermore, the person skilled in the art will understand that the thermal device or system uses the excess heat generated by the turbulence cooling unit (10) as an energy source. The system and device of the present invention can also further comprise a detector (not shown) for detecting the amount of pollutants/contaminants present in the output flow of the at the output end of the fluid output chamber (18). A valve system, widely used in the art, interconnects the different parts of the turbulence cooling device of the present invention. However, based on specific usage, it will be understood that it is possible to connect (e.g. soldering) the metal parts or tubes or pipes of the system together directly. Moreover, when the contaminants/pollutants are volatile organic compounds, the system of the present invention can further comprise a multi-stage photolysis step (not shown) after the mixing step in the mixing zone (16). As known in the art, it will be understood that the system of the present invention could also comprise one or a plurality of drying agent cells.

In function, as shown in FIG. 1, a pollutant-containing hot fluid (30) to be treated enters the fluid input chamber (12). This pollutant-containing fluid (30) can be at various temperatures up to, for example, 500° C. The cool turbulent air flow (32), for instance ambient air at standard atmospheric temperature, generated in the turbulence flow chamber (14) is mixed with the pollutant-containing fluid (30) in the mixing zone (16) to produce a mixed fluid containing the pollutant(s) or contaminant(s) (34). The temperature of the resultant mixed pollutant-containing fluid (34) is decreased due to the mixing of the pollutant-containing hot fluid (30) with the turbulent cool air (32) generated in the turbulence flow chamber (14). Then, the mixed pollutant-containing fluid (34) is passed through an adsorbent material or interface (20) disposed in the fluid output chamber (18) and adapted to form a complex or chemically react with, or adsorb the pollutants and/or contaminants present in the mixed pollutant-containing fluid (34). The resulting warm fluid (36) is free of pollutant and/or contaminant. As mentioned above, the tubing can be soldered directly or connected using a valve system (e.g. metering valve and shut-off). Furthermore, it will be understood that one or a plurality of thermocouples and probes can be added to the system to follow the temperature and pressure dependence, respectively. Also, relative humidity at inlet and outlet points can be measured with techniques known in the art.

In other words, the system of the present invention comprises a fluid input chamber (12) having an inlet and an outlet, the fluid input chamber (12) being adapted to receive and carry a fluid to be depolluted or decontaminated, a turbulence flow chamber (14) having an inlet and an outlet, and comprising a plurality of turbulators, said turbulence flow chamber (14) being connected to the outlet of said fluid input chamber (12) and adapted to generate a cool turbulent air flow (32), a mixing zone (16) positioned at a point of junction where the fluid to be depolluted or decontaminated (30) is mixed with the cool turbulent air flow (32) to produce a mixed pollutant- or contaminant-containing fluid (34), and a fluid output chamber (18) comprising an adsorbent material (20). In function, the mixed pollutant- or contaminant-containing fluid (34) passes through the adsorbent material (20) of said fluid output chamber (18) to be depolluted or decontaminated.

In a preferred embodiment, the adsorbent interface (20) of the system (10) is coupled to a recycling and recovery system (6) as electrochemical cells (electrolysis unit) (24) or thermal treatment devices or systems. These systems are known in the art and will not be described in further detail. Energy (38) for the desorption system (22) can be supplied, for example, by any system known in the art to produce energy as, for example, solar energy, wind energy, geothermic energy, or alternatively by conventionally generated electricity using coal combustion, fossil fuel, hydroelectricity, and the likes. In desorption system (22) serves, amongst others, to regenerate the adsorbents (20) for subsequent use in the process of decontaminating pollutant-containing hot fluids. Furthermore, it will be understood that the extra heat (40) produced from the turbulence flow chamber (14) can be transferred and used, for example, in the decontamination and the cleaning of the adsorbents (20) in the electrochemical cells (24). In other words, the extra heat (40) produced by the turbulence cooling unit (14) can be recycled as a source of energy for the recycling and recovery step (22). The person skilled in the art will know how to reuse the extra heat in order to obtain the desired result as, for example, further purification of the waste. The electrochemical process of the present invention could comprise a cyclonic separation and/or a magnetic separation process.

It will be understood that since the improvement in adsorption efficiency is directly related to the decrease in temperature, the improved efficiency is also applicable to all compounds adsorbable on surfaces. Thereby the efficiency of any adsorbable compound (whose adsorption efficiency show an inverse relationship with temperature) can be improved using the coupling of turbulence cooling to the air stream.

Exemplary systems have been developed to perform the method in order to capture, for example, $NO_x$, mercury, VOCs (volatile organic compounds), $CO_2$, pollutant intermediates as well as aerosols and bio-particles from a hot fluid and are further described in the Examples. It will be understood that various designs of the turbulence cooling units of the present invention are feasible and can be tailored for particular applications, and thus the designs herein included should not be considered as limiting. The person skilled in the art will know how to design the system of the present invention in view of a specific application. For example, the chemical composition of the tubing, the diameter, structure, positions, and numbers or metal barriers inside the tube which create turbulence, the type of conduits or pipes used in the assembly of the turbulence cooling device or unit (10) of the present invention could vary in function of the type of fluid to decontaminate, the temperature of the hot fluid at the entrance of the system, the desired temperature to reach in order to obtain an optimal absorbance and the removal of the pollutants/contaminants.

The system and method of the present invention can be applied and are efficient for a wide range of sources emitting major pollutants. The method and system of the present invention can be used in a great variety of applications from decontamination of a fluid, recycling, extraction and recovery of elements and chemicals, detection or tracing of particles and chemicals in a fluid in various domains such as transport, sewage and waste treatment, water and soil contamination, hospital waste, facial masks, air circulation filters, indoor air quality and circulation, mercury recycling from products (e.g. Hg-lamps, artisanal mining, stack emission), arsenic recycling from products such as cell-phones. The adsorbent of the present invention can also be used in the preparation of masks (e.g. for removal chemical and biological pollutants, including biological particles), filters or any other material in stagnant or moving fluid where undesirable particles have to be eliminated or retained. This technique can be used for pollutant reduction indoor (air circulation inside buildings, improvement of filters and air purification units) and outdoor. The technique is particularly promising for waste treatment procedures (e.g., city sewage waste, hospitals and industrial usages). It can also be used in air-purification systems inside transport vehicles. The technique can also be used for trace measurement (sensor and probes) of any of aforementioned pollutants that can depict adsorption properties (for example, usage of the nanoadsorbent for measurement of bioparticles, VOC, NOx, etc).

EXAMPLES

The Examples set forth herein below provide exemplary preparation of certain representative materials of the invention. Also provided are exemplary systems and methods for performing the invention.

Unless otherwise indicated, all numbers expressing quantities of ingredients, conditions, concentrations, properties, and so forth used in the specification and claims are to be understood as being modified in all instances by the term "about." At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contain certain errors resulting from variations in experiments, testing measurements, statistical analyses and such.

The present invention also relates to novel materials (adsorbent, particles, coatings, etc) and their preparation. The following detailed examples describe how to prepare the various materials and/or perform the various processes of the invention and are to be construed as merely illustrative, and not limitations of the preceding disclosure in any way whatsoever. Those skilled in the art will promptly recognize appropriate variations from the procedures both as to starting materials and as to conditions and techniques. In some cases, the materials may be commercially available.

1. Preparation of Adsorbents

Most existing types of adsorbents would be suitable for use in the present invention, provided that the material of the adsorbent forms chemical and physical interactions (such as physisorption or chemisorption or chemical reactions on their surfaces) with the contaminant/pollutant to be removed from the fluid. The person skilled in the art will know which adsorbent to select having regard to the contaminant/pollutant to be removed from the fluid. It was found that microparticles, and more particularly nanoparticles as they offer a greater surface area, are most effective for use as adsorbent. A wide diversity of nano-, micro- and macroparticles that exist in nature as, for example, in the form of aerosols such as sulfur, dust particles, and clay minerals were used and tested in the system of the present invention. When these naturally found adsorbents containing nano-, micro- and macroparticles are used, the setup of the present invention is entirely green when, of course, the starting materials (hot fluids) are not, for example, synthesized in laboratories.

Particle Coating

Nanoparticles were deposited as one or more coats on granular activated carbon, porous stainless steel substrates, facial masks, filters, grids and magnetic bars stripped from their Teflon coating, or any others substrates known by the person skilled in the art. In presence of water vapor for instance, many nanoparticles attach to each other, i.e. coagulate, and form clusters at different size distribution, including microparticles.

Heterogeneous interfaces including stack of different disks, or the same material on the same surface (mask/grid/film/filter/bar/etc) were also prepared.

a) Iron Oxide Magnetic Particles

Iron oxide was prepared by co-precipitation of $FeCl_2.4H_2O$ and $FeCl_3.6H_2O$ by addition of $NH_4OH$ in hot de-oxygenated distilled water. The precipitate was washed with de-oxygenated distilled water and then dried for 2 days at 50° C.+/−3° C. (the error bars on temperature are +/−3 degree in the text, otherwise specified). Coating of the magnetic bar was done by soaking the bar in the above prepared mixture followed by drying at 50° C. for 2 days. The surface area of the prepared particle was measured as 58 $m^2 \cdot g^{-1}$.

Granular activated carbon (GAC, soaked in $HNO_3$ for ~4 hours and then dried for ~12 hours in an oven at 120° C.) was added to the prepared mixture (before drying) and stirred at 85° C.+/−3° C. for about 1 hour). The GAC coated with iron oxide was dried in an oven at 120° C. for 2 days. The surface area for the coated GAC was measured as 934 $m^2 \cdot g^{-1}$. The surface area for uncoated GAC was 1117 $m^2 \cdot g^{-1}$. Based on the experimental conditions, one can modify significantly the surface area.

In the case of filters and facial masks, the nano- and macroparticles were adhered or fixed or attached to the cellulose (or $Mn(OH)_2$) filter surfaces to prevent their free movement with the air circulation. For example, cellulose beads were prepared using conventional techniques such as carboxymethyl cellulose (CMC) beads prepared by dissolving CMC in water followed by the addition of $Fe_3O_4$ nanoparticles in powder form. The mixture was dropped into a 0.2M $FeCl_3.6H_2O$ bath to regenerate the CMC. Subsequent coatings were carried out by mixing the prepared beads in a slurry of $Fe_3O_4$ in water. Beads were dried at approximately 50° C. and deployed in the filters.

b) GAC Coated with Powdered Activated Carbon

GAC was also coated with activated carbon powder by soaking the GAC, treated in APTS (1,2-aminopropyltriethoxysilane) for 2 minutes in a carbon powder (surface area measured as 815 $m^2 \cdot g^{-1}$) suspension (Triton X and distilled water) under nitrogen and/or helium atmosphere. Several coats were applied by drying the GAC covered with powder carbon with nitrogen and then dipping again in APTS followed by the carbon suspension. Finally, the covered GAC are left in $HNO_3$ for 1 hour and then dried for 1 hour. The same procedure was used to coat stainless steel disks. It will be understood that, depending on the laboratory conditions, the surface coverage can be modified.

c) GAC Coated with Alumina Nanoparticle

A bohemite solution was prepared by dissolving aluminium isopropoxide in hot water followed by addition of $HNO_3$ and refluxed overnight. The GAC was then soaked in the bohemite solution followed by drying at temperature of 100-400° C. to form gamma-alumina.

d) Stainless Steel Disks Coated with $TiO_2$

Titanium isopropoxide was hydrolyzed with ultra pure deionized water. An aqueous solution of $H_2O_2$ was added to dissolve the precipitate and yield an orange solution in which the substrate was dipped and pulled out at a constant rate and dried at room temperature followed by drying at 100° C. for 2 hours and finally at 300-400° C. for about 1 hour.

Stainless steel disks coated with alumina powder (surface area 155 $m^2 \cdot g^{-1}$) was dispersed in an $HNO_3$ aqueous solution and stirred for 16 hours. The substrates were then dipped for 10-20 seconds, removed at a constant rate and dried at 330-370° C. Several coats were applied by successive dipping, removal and drying.

e) Gold Nanoparticle Preparation

Generally, a single layer of Au-nanoparticle surfaces is coated onto stainless-steel interface and/or a wire/filter/etc.

A stainless-steel wire was cleaned with a 3:1 mixture of concentrated $H_2SO_4$ and 30% $H_2O_2$, both to remove trace organics and other contaminant/pollutants and to increase the number of pendant oxygen atoms available for silanization on the surface. The cleaned wire was then immersed for two minutes in a solution containing 60 μL of 3-(aminopropyl)-trimethoxysilane (APTMS) dissolved in 15 mL of a 3:1 mix of 18.2 MΩ water and ethanol. After silanization, loose silanes were removed from the surface by rinsing with ethanol, and the wire/filter/trap was blown-dry with UHP $N_2$ gas. The APTMS was allowed to cure at room temperature for several hours before continuing the solid phase microextraction (SPME) preparation. Once the APTMS-covered wire had cured, it was immersed in a gold nanoparticle colloidal solution for 15 minutes, under agitation. The electrostatic attraction between pendant amines on the silane film and gold nanoparticles resulted in a fine coating of gold on the surface.

f) Preparation of Sulfur Containing Nanoparticles

In addition to pure gold, traps using elemental sulfur as well as coated iron and cupper nanoparticles were used.

As a support, 2 g of 1:1 elemental sulfur support was used. The sorbent was preconditioned under $N_2$ at 400° C. for 6 hours to produce bis-[3-(triethoxysilyl)propyl]tetra-sulfide] ("S4"). S4 was also coated onto copper-doped iron or copper oxide nanoparticles. Other sulfur containing compounds such as sulfuric aerosols isolated from atmosphere were coated the iron and cupper nanoparticles.

g) Preparation of Heterogeneous Adsorbents

Since more than one contaminant/pollutant may be present in a hot fluid at a time, heterogeneous adsorbents have been prepared where particles (at different scales ranging from nano- to microparticles, as well as larger coating and films) made of materials suitable for adsorbing each contaminant/pollutant were assembled together to have an adsorbent capable of adsorbing more than one contaminant/pollutant at once. The different materials can also be assembled together in a stack, on a disk form where each material forms a triangle, or any other arrangement suitable for exposing the different material to the fluid to be treated. It will be understood that the nano- and micro-aerosols (or particles) can be also attached to porous surfaces such as, but not limited to, cellulose. If so, they can be used as, for example, filters in masks including facial masks, filters in indoor air circulations, or any others types of filters adapted to, for example, waste treatment in fluids such as gas, liquid and multiphases.

h) Preparation of Seasalt and Sulfate Adsorbents

A multistage impactor was used for air sampling with a cutoff range of about 50 nm to about 10 microns. Due to electron microscopy studies with electron dispersion method, major populations and types of aerosols in each size fraction was identified. The fraction of sulfate and seasalt (over marine boundary layer) were collected and used as adsorbents for the experimental studies.

Sea salt particles isolated from air using multi-stage impactors in the aerodynamic diameter range of 1-4 microns were used in pure (milli-Q; resistance 18Ω) water solution, and preconditioned under $N_2$ and He, at temperature range of 50-100° C. to coat metal- and metal-oxide core nano and macro-particles. For sulphur containing aerosols, the nanosize up to 2 micron size range was used with a similar preconditioning and coating procedure.

2. Exemplary Systems and Testing a) Nitrogen Oxides ($NO_x$) Removal

Figure 2A:
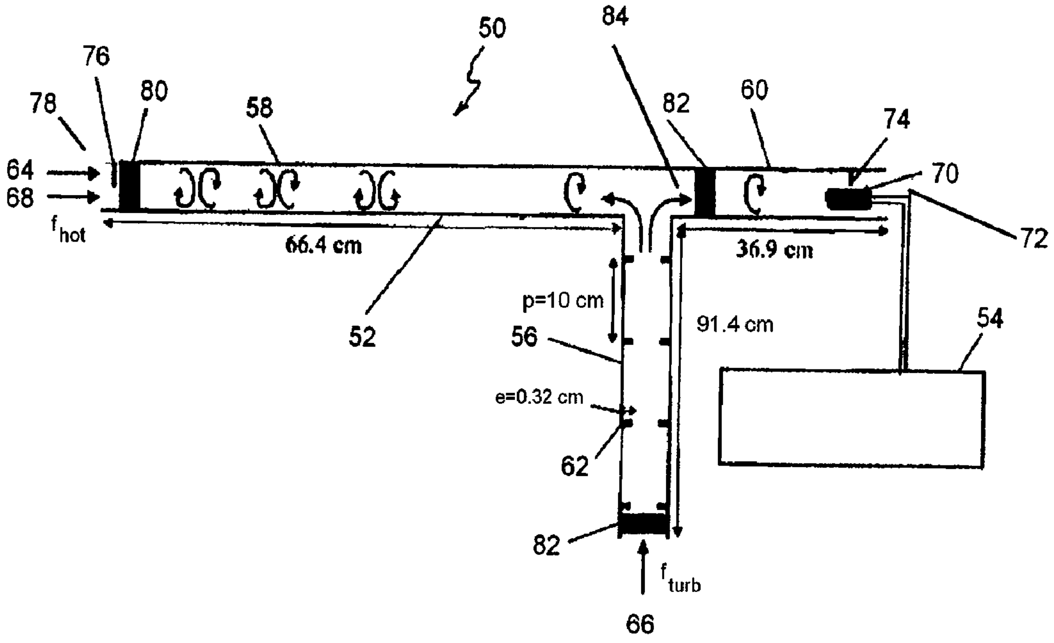
FIG. 2(*a*) depicts the simplified schematic of a cooling setup used for NOx (NO+NO2) studies.

A schematic representation of the adsorption system (50) comprising the gas stream cooling device (52), adsorbents and $NO_x$ analyzer (54) is shown in FIG. 2 (*a*). Different ways of forming turbulence flow were employed, and all of them yielded efficient cooling. The turbulence cooling unit (52) consisted of three copper pipes joined together (56, 58, 60) with diameter (D=5.08 cm) and length as shown in FIG. 2(*a*). Brass screws (62) (length=1.28 cm, diameter=0.63 cm) were screwed directly into the turbulence pipe (56) to act as turbulators. Different configurations were used to permit best cooling of the air stream and it was determined that the best cooling was obtained for p/e=31.3 and e/D=0.06, wherein p represents the vertical distance between two screws, e represents the length of the screw and D is the diameter of the pipe. It will be understood that various designs of a turbulence cooling units (50) are feasible and can be tailored for particular applications, and thus the design herein included should not be considered as the only design. The hot air (64) was provided by a temperature controlled heat gun, while the turbulent cool air flow (66) was provided by a compressor (not shown). The NO gas feed (68) was composed of NO diluted in dry $N_2$ at a concentration no higher than 1 ppm. A vacuum line (not shown) was attached to the exit of the cooling apparatus (52) in order to recuperate the NO from the feed gas. The chemoluminescence NO—$NO_2$—$NO_x$ analyzer (Thermo Environmental Instruments™ model 42C) used detects NO and $NO_2$ in the concentration range 0-100 ppm (1 ppm~$2.46\times10^{13}$ molecule $cm^3$); 1 ppm=1000 ppb) with a precision of 1 ppb. A glass cell (70) containing activated alumina as $NO_x$ adsorbents was attached to the input line to the $NO_x$ analyzer (54) located just before the exit (72) of the cooling apparatus (52), A first thermocouple (74) was wrapped around the glass cell (70) and provided the temperature of the gas at the exit (72) of the apparatus (52), which is denoted by $T_{out}$. A second thermocouple (76) was located at the entrance (78) of the cooling apparatus (52) where another adsorbent cell (K—Na alumino silicate molecular sieves) (80) was found and provided the temperature of the entering hot gas stream, which is denoted as $T_{in}$. Alumino silicate molecular sieves enclosed in aluminum cells (82) were located at the entrance (84) of both the hot air and turbulence tubes and in the exit tube, while some more were spread over the surfaces of the tubes in order to capture humidity in the air feeds to avoid formation of $HNO_3$ in the presence of $O_2$ and $NO_2$. These aluminum cells (82) were also efficient at capturing $NO_x$ at relatively low temperature (T<60° C.). Activated alumina and alumino silicate molecular sieves were chosen as adsorbents because they can be regenerated and offer a low-cost alternative to the use of metal oxides such as $ZrO_2$ often used for $NO_x$ capture. However, it will be understood that other adsorbents can be chosen based on specific requirements of the specific industry. Moreover, metal oxides are highly porous and are thus very effective at capturing $NO_x$ at low temperature, while they become inefficient at temperatures above 60° C.

The adsorption tests at different temperatures in combination with the cooling turbulence unit were performed in the following manner: all tubes/pipes and adsorbents were initially flushed with dry $N_2$ or He for about 15 minutes in order to remove impurities or moisture that could be present on the surfaces of the tubes/pipes. Then the valves for controlling the cool turbulent air flow and exit vacuum lines were opened and the heat gun providing the hot air stream was turned on (at the lowest temperature setting), along with the NO feed gas. The temperature was then left to equilibrate in the system. Once stable temperatures were obtained at both the entrance and the exit of the system, recordation of the temperature and of the NO and $NO_2$ concentrations were started. Then, the temperature was increased again and records were taken only once equilibrium was reached. About five records for each temperature setting were obtained.

Figure 2B:
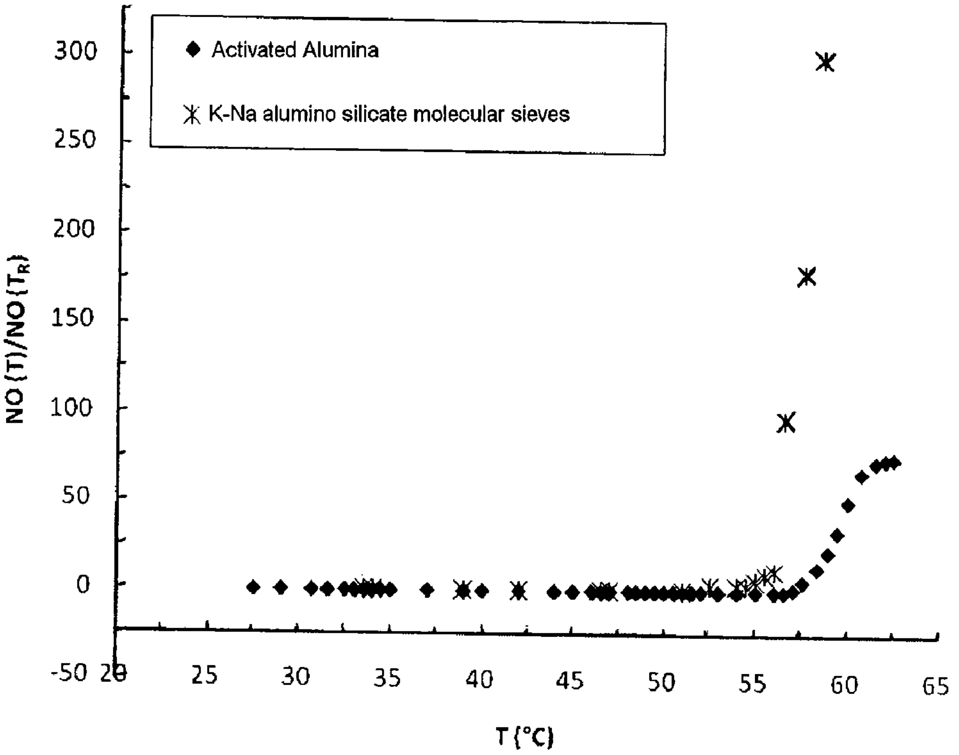

FIG. 2(*b*) illustrates the results obtained by monitoring the NO and $NO_2$ concentration reaching the $NO_x$ analyzer from a gas stream containing a low concentration of NO diluted in pure He and passed through activated alumino and K, Na alumino silicate molecular sieves at different temperatures. FIG. 2*b* illustrates the efficiency of alumina and alumino silicate adsorbing materials in $NO_x$ removal at various temperatures of approximately 50-500° C. This adsorbing material is not efficient at temperatures above c.a., 55° C. Indeed, both adsorbing materials used in this experiment are very good for $NO_x$ removal at a temperature of below or equivalent to 55° C. However, it has been demonstrated that these materials fail in their adsorbing capacity when used with temperatures above this level and are not efficient in the adsorption of pollutants such as $NO_x$. However, by coupling this interface to a turbulence cooling unit, the temperature of the fluid containing $NO_x$ pollutant is reduced to less than 60° C. Thus, the adsorbing materials (alumina and alumino silicate), despite the original high temperature of the fluid, become once again quite efficient. As expected, the data in the FIG. 2(*b*) that started at T>100° C. and then reduced to 55° C. are identical to the data taken at initial temperature of 55° C. In summary, it has been demonstrated that the problem of negative relationship between adsorption and high temperatures can be resolved by using a turbulence cooling unit.

Figure 3:
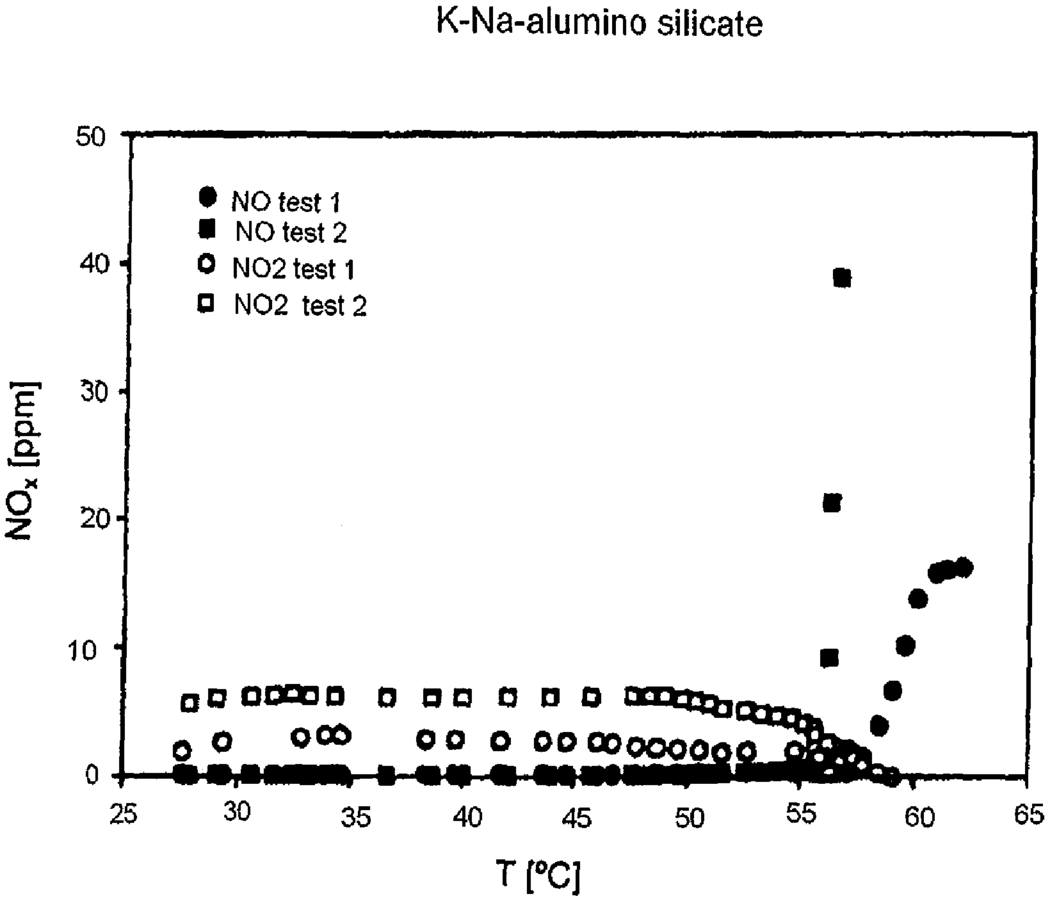
FIG. 3 shows the NO, $NO_2$ concentrations relative to the respective concentration, as a function of temperature.
Figure 4A:
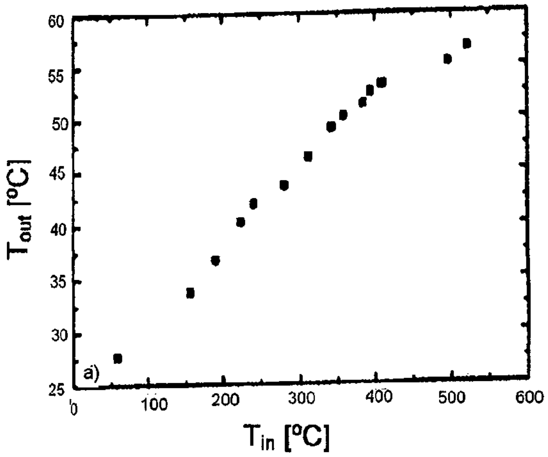
FIG. 4(*a*) illustrates the gas temperature at the exit of the cooling device as a function of its temperature at the entrance ($f_{turb}$=140 L/min)
Figure 4B:
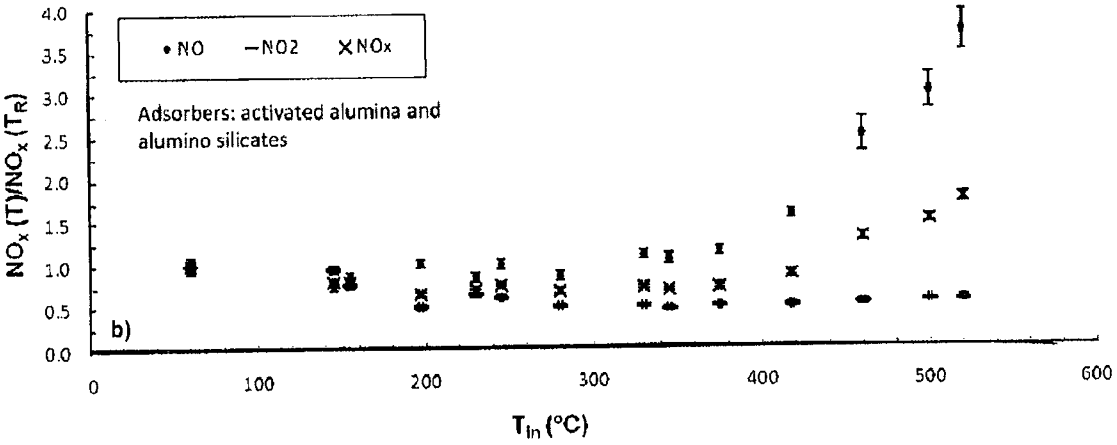

Results of $NO_x$ removal in function of temperature are illustrated in FIG. 3. Similar results for $T_{out}$ as a function of $T_{in}$ and for relative $NO_x$ concentrations as a function of $T_{in}$ are also shown in FIGS. 4(*a*) and 4(*b* respectively. These results were obtained in a different measurement run performed with a larger $f_{turb}$=140 L/min and the same $f_{hot}$. As can be seen, cooling is improved by the use of a larger turbulent flow and the exit gas temperature is reduced to 53° C. for an entrance gas temperature of 410° C.

Natural seasalt and sulfate particles, as described in Example 1(h) above, were also used as adsorbents for removing $NO_x$. The removal rates obtained are of about 30-60% for $NO_x$ as well as $SO_x$. The results obtained show that natural nanoparticles can be used to remove pollutants when isolated. The conditions used may not have been optimal but can be improved by modifying, amongst others, the turbulence flow properties as well as the preparation of the particle coating.

b) Mercury Removal

As an example, Gold (Au) amalgam traps have been prepared for recovering mercury (Hg) as follows.

Gold's ability to readily combine with mercury at room temperature and form an amalgam makes it an ideal candidate to extract elemental Hg from ambient air. Heating of the resulting Au—Hg amalgam above 350° C. (mercury's boiling point) renders the amalgam thermally unstable allowing the Hg contamination to be released and returning the gold to its original state.

Figure 5:
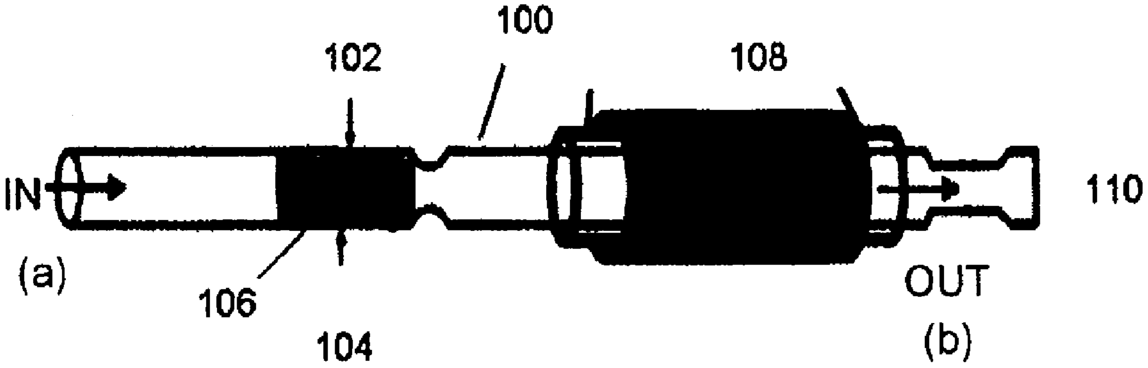
FIG. 5 is a schematic representation of the gold amalgam (GA) trap used for the initial amalgamation tests with mercury.

While traditional amalgamation studies have used macroscopic Au particles to combine with Hg, moving to micron or nano-sized particles increase the efficiency of the amalgamation process by providing the mercury contaminants/pollutants with a larger surface area per sample mass to amalgamate with. To test this, a gold amalgam trap (100) as illustrated in FIG. 5 was prepared. Gold powder (102) composed of gold flakes/spheres of about 3 microns of diameter (Alfa Aesar Gold flakes/spheres, APS 2.2-3.5 microns, 99.96% (metal basis), stock number 42153-06) were mixed into a sample of quartz wool. The preferred method for preparing the gold-quartz wool matrix was to create a propanol solution containing about 1 g of gold powder and then allow a sample of quartz wool to soak up the entire solution. The resulting wet gold-quartz wool sample was then placed in an oven heated to 125° C. to help the propanol evaporate. Once dry, the Au-quartz wool matrix was ready.

The other components of the gold amalgam trap (GA trap) (100) are two concentric quartz tubes (LaSalle Scientific, LaSalle, QC, Canada) (104, 106), which are superposed, and a nichrome resistance heating wire (Omega Engineering, Inc., Laval, QC, Canada) (108) capable of heating the GA trap (100) and releasing the amalgamated Hg. The outer quartz tube (104) (10.0 mm od, 8.0 mm id) used to coil the nichrome wire (108) (Ni80-Cr20, 85 cm, 36 loops, 1,015 O ft_1) easily slid around the inner quartz tube (106) (7.0 mm od, 5.0 mm id) allowing one to quickly heat the GA trap (100) to cool. A variable transformer (not shown) was used to heat the nichrome wire (108) and give users the possibility to vary the heating temperature as needed. This allowed users to heat the GA trap (100) up to 500-600° C., and release the trapped Hg from the gold powder (102).

Once inside the inner quartz tube (106), the Au-quartz wool matrix was exposed to argon gas containing variable amounts of elemental Hg vapour. As the argon gas/Hg vapour mixture flowed through the gold powder/quartz wool matrix, amalgamation between the gold micro-powder and Hg removed the mercury contaminant/pollutants from the argon flow. The resulting air flow (110) was then sent to a cold vapor atomic fluorescence spectrometer (CVAFS) device (Trekan 2600™) to measure any remaining Hg traces and determine the efficiency of the amalgamation process. The GA trap (100) was then heated using the nichrome heating wire (108) to remove the Hg from Au powder (102) readying it for the next mercury sample.

Figure 6:
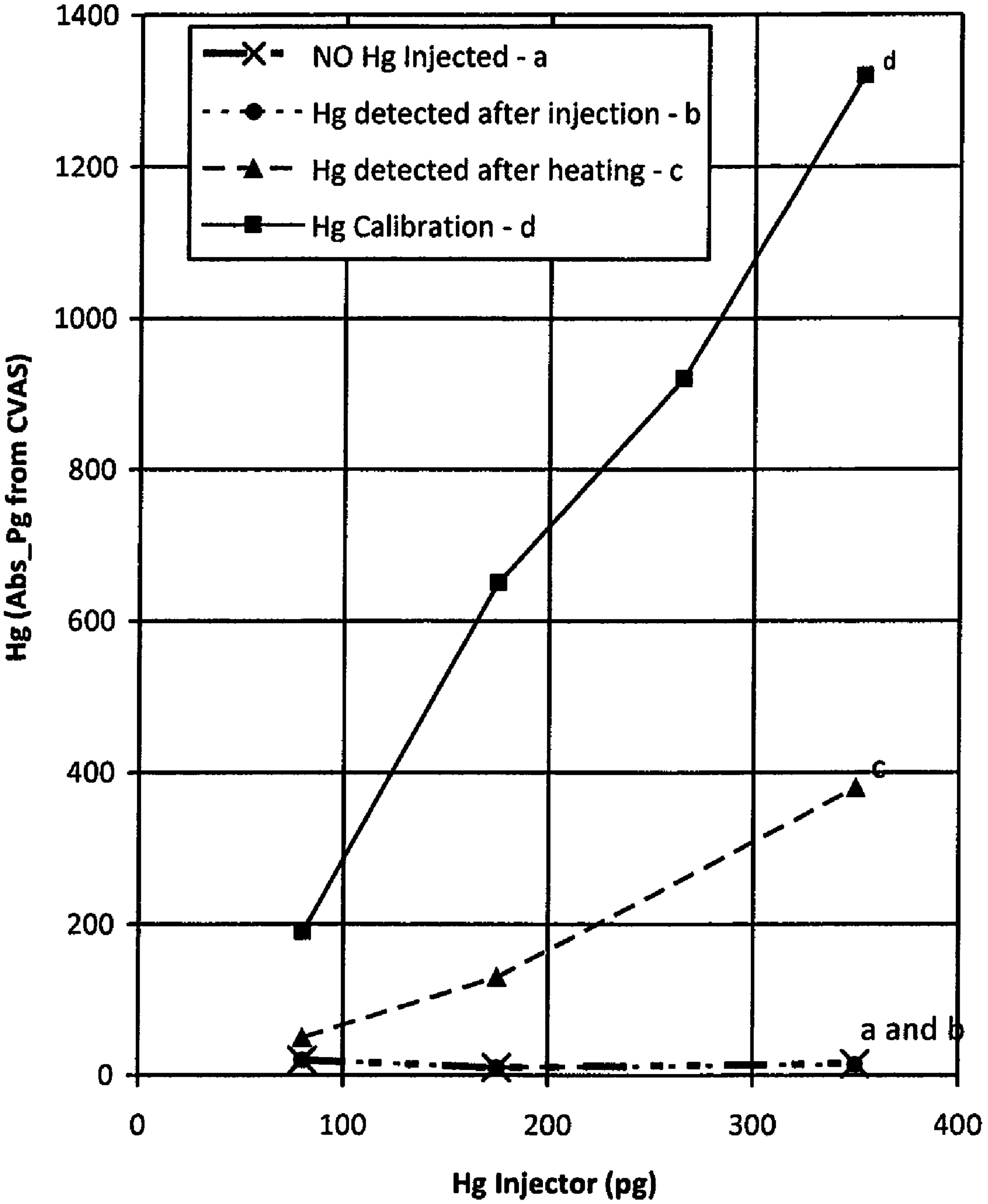
FIG. 6 illustrates the efficiency results from the tests using the GA trap and various amounts of mercury injected into the argon flows.

FIG. 6 illustrates efficiency of the GA trap (100) at removing elemental Hg from the argon flows. Once the tainted argon samples were filtered through the Au-quartz matrix, they were virtually indistinguishable from clear argon air flows, showing that the gold powder was very efficient at removing the Hg contaminants/pollutants at the given flow rates. Results shown in FIG. 6 demonstrate the following four different scenarios. The first scenario does not include any mercury and present only ultrapure argon flow (shown as No Hg injected (a) in FIG. 6). The second scenario is called calibration (d). This second scenario exhibits that if the mercury concentration is increased in the flow, the signal of mercury, detected by cold-vapor fluorescence spectrometry, increases. This shows what is expected when an instrument functions linearly. The first two scenarios are run at room temperature. The third scenario (shown in FIG. 6 as Hg detected after heating (c)) illustrates a case when a gold nanoparticles interface was used at temperatures up to 1000° C. The present graph presents the results obtained at 400° C. without the use of the turbulence cooling system. In this case, the amount of mercury injected is similar to the calibration case. However, it is seen that the signal is almost half of the calibration case, which suggests that nanoparticles are removing Hg at relatively high temperatures, but not completely. The fourth scenario (depicted as Hg detected after injection (b)) present a case where the temperature starts from around 400° C. This scenario is combined with a turbulence cooling system as described in the present description. After the passage of the flow through the turbulence cooling device, the original temperature is decreased to near room temperature before passing through a gold nanoparticle interface. Surprisingly, the results obtained are undistinguishable from the first scenario where there is no Hg in the system. This clearly demonstrates that the combination of a turbulence cooling device with a nanoparticle interface allows the removal of mercury at a wide range of temperatures used currently at various industrial usage.

Figure 7:
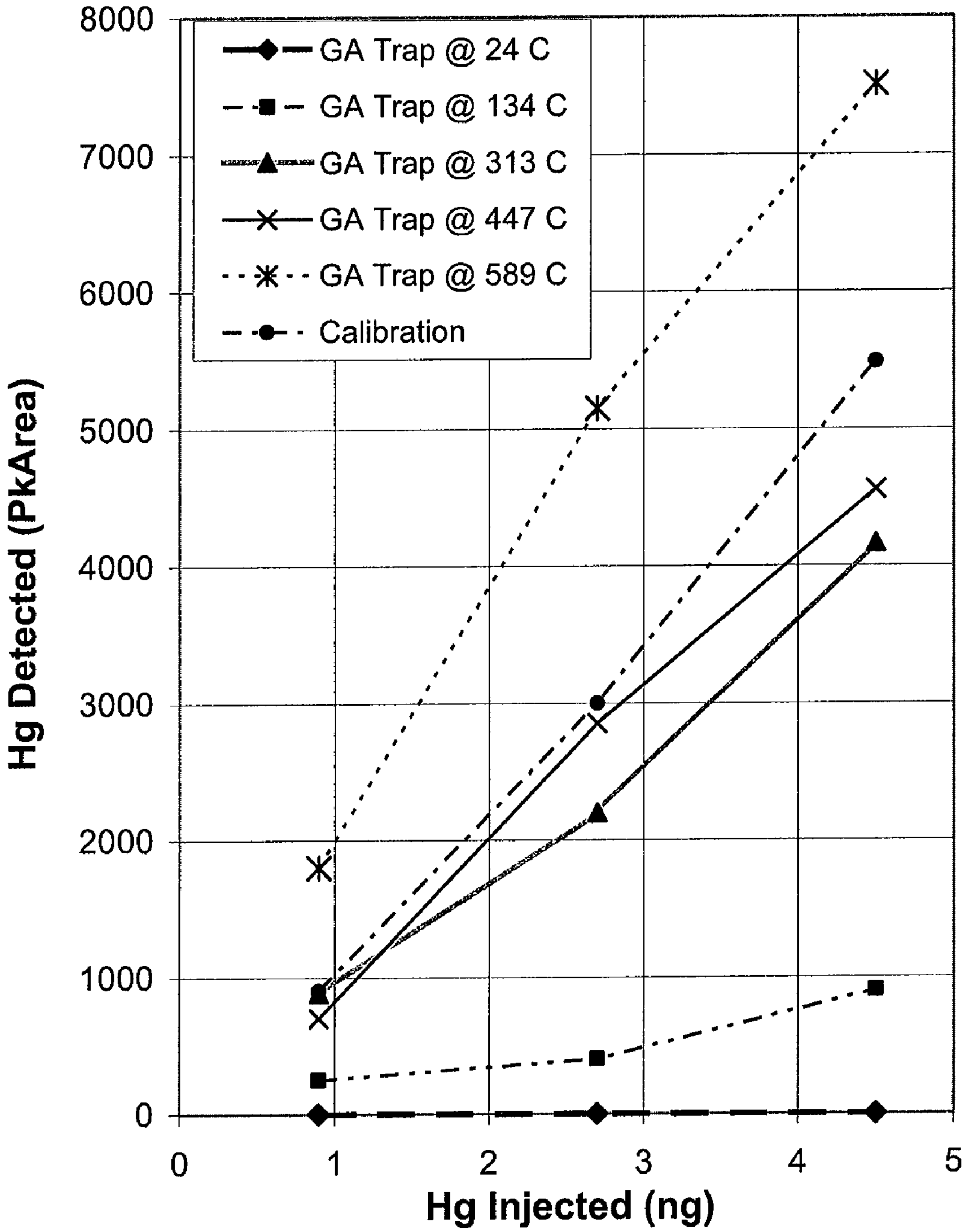
FIG. 7 illustrates the efficiency results from the tests using the GA trap at different temperatures and various amounts of mercury injected into the argon flows.
Figure 8:
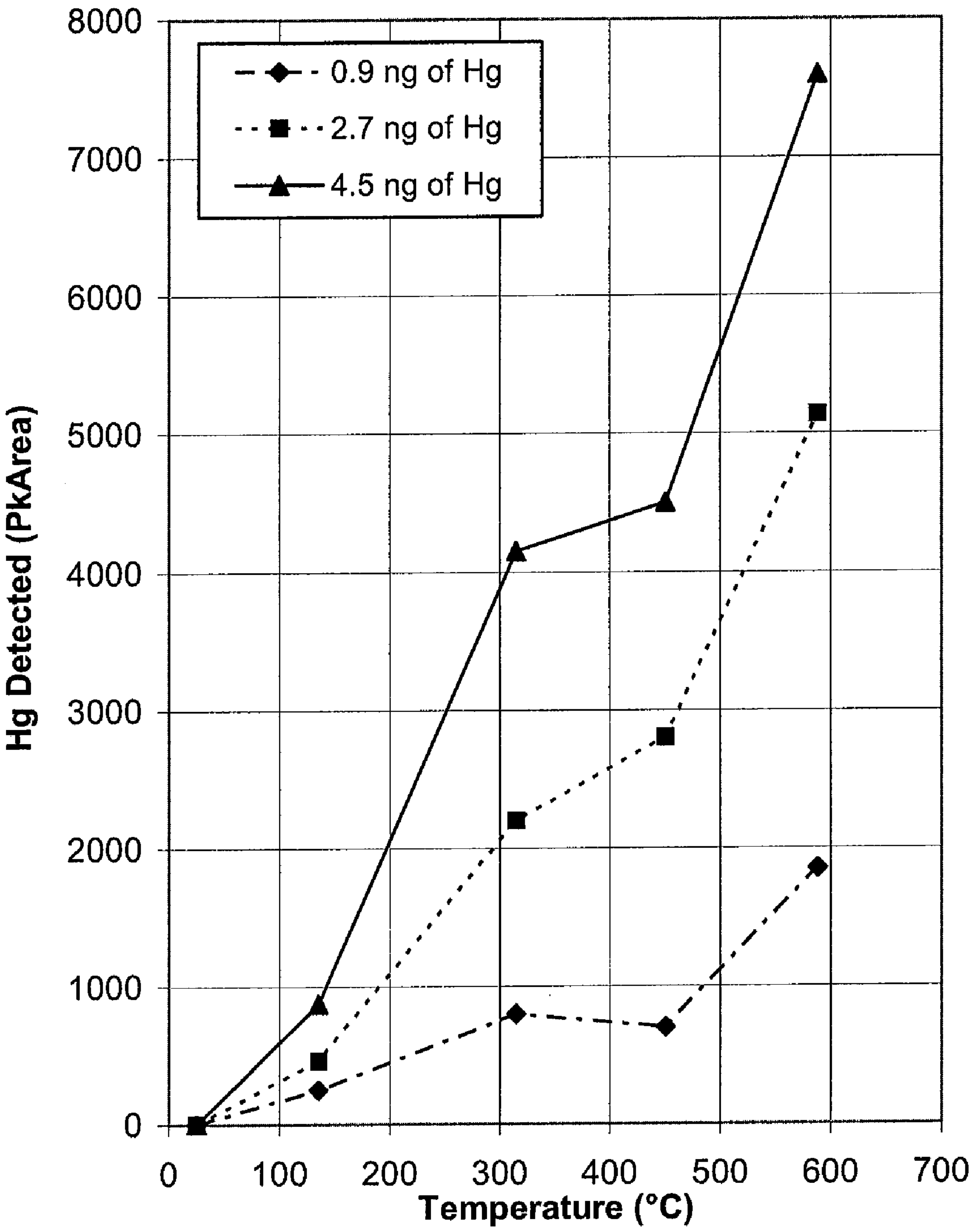
FIG. 8 illustrates the behaviour of the GA trap at various temperatures at a given level of mercury without turbulence cooling.

Given the sensitivity of the amalgamation process to ambient temperature, the efficiency of the GA trap at removing Hg from argon flows was measured at various equilibrium temperatures. The results of these measurements (see FIG. 7) clearly show a decrease in the efficiency of the amalgamation process at higher equilibrium temperatures. In fact, at 589° C., the Hg signal is much stronger than the calibration curve showing that traces of Hg found in the quartz wool and in the Au powder prior to being exposed to a given argon flow are being released and detected by the CVAFS. Also, FIG. 8 shows that the GA trap behaves very similarly at a given temperature regardless of the amount of Hg that is injected into the argon stream. After a certain point, the GA trap saturates and the remaining Hg is left in the argon flow. The Applicant has further demonstrated that, with the use of a recycling and recovery system, these traps or interfaces can be generated using a green technology such as electrochemistry or any other types of system known in the art.

Figure 9:
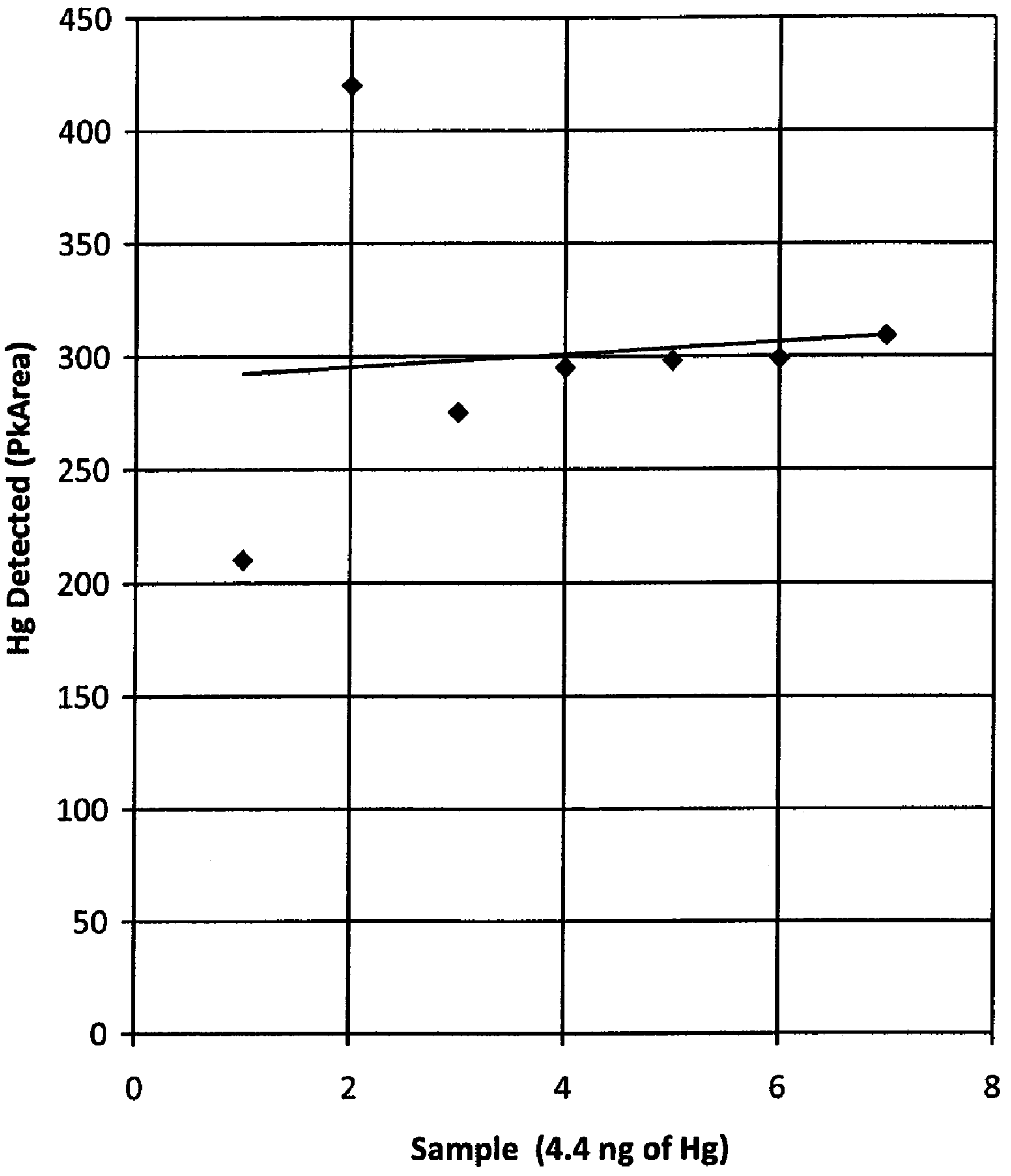
FIG. 9 illustrates the behaviour of the GA trap at room temperatures and at constant mercury leading without heating cycles.

FIG. 9 also shows how the performance of the trap evolves over time by taking several data upon the exposure of one trap to a flow rich in Hg (4.4 ng of Hg was initially added). The data was analyzed over a period of about 6 hours. The trap (at room temperature) shows a slight decline (not shown in FIG. 9Y in its capacity to adsorb Hg contaminants/pollutants from the argon gas flow. This decline is not very noticeable. This suggests that the gold powder is capable of adsorbing a great quantity or concentration of Hg before needing to be heated and "cleaned".

Figure 10:
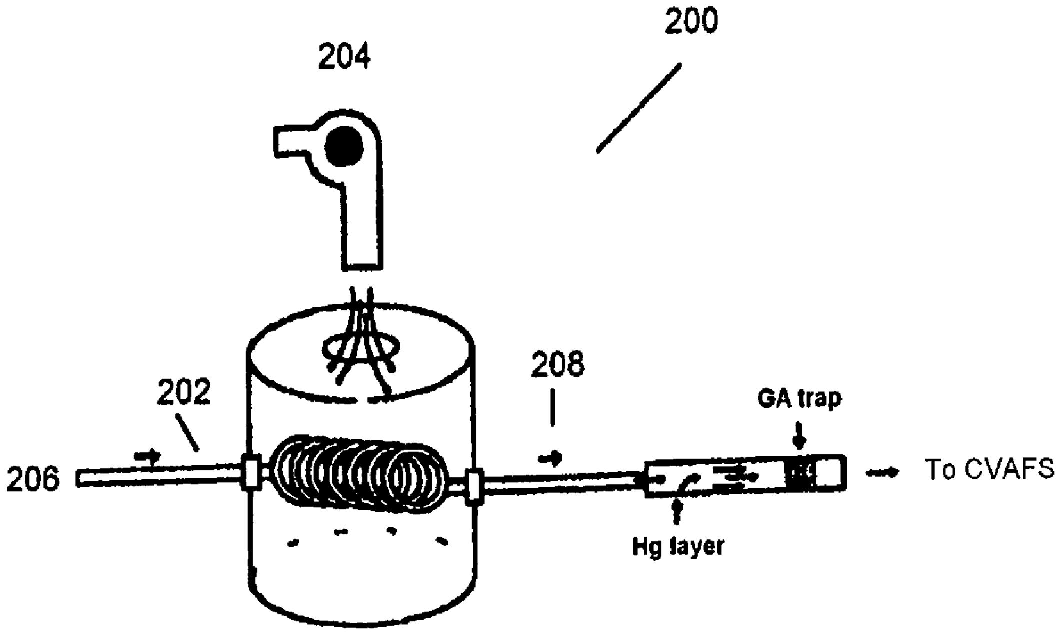
FIG. 10 is a schematic representation of the second version of the GA trap used to heat argon flows.

In order to test how the Au-quartz matrix behaves when exposed to hot argon-Hg flow, a modified GA trap (200) was developed and is shown in FIG. 10. The GA trap (200) is kept at room temperature and mounted in a standard Swagelock fitting. The cold argon gas and a flow input (206), on the other hand, is fed through coiled a copper pipe/tube (202) which is heated using a 1450 Watt Proheat Variptemp heat gun (204). Because the flow rates in this system (200) where much higher than in the previous GA trap system (typically 20-30 LPM) the maximum temperature reached by the argon flow (and hot flow output) (208) would only be 200-250° C. This temperature range was chosen as the average operating of the major Hg-emitting industries is within this range. It will be understood that the operating temperature range of the trap can be changed by using principals of flow dynamics.

Figure 11:
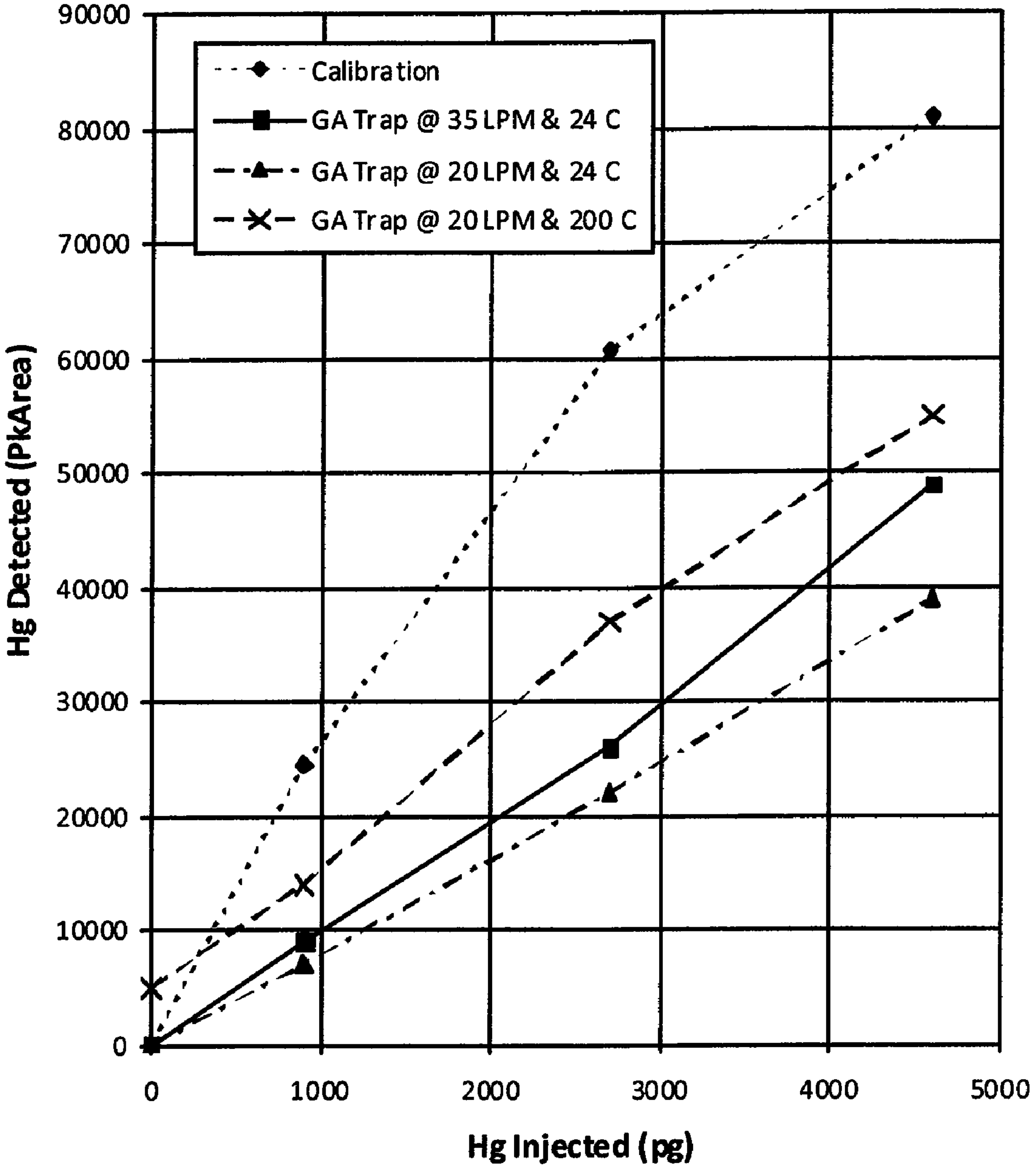
FIG. 11 illustrates the efficiency results from the tests using the second version of the GA trap with various argon flow rates and hot argon gas flows.

FIG. 11 shows the efficiency of the gold powder at removing Hg contaminants/pollutants from hot argon gas flows. As expected, the efficiency of the trap drops at higher temperatures but increases at lower flow rates suggesting that Hg has more time to interact with the gold particles and amalgamate.

Figure 12:
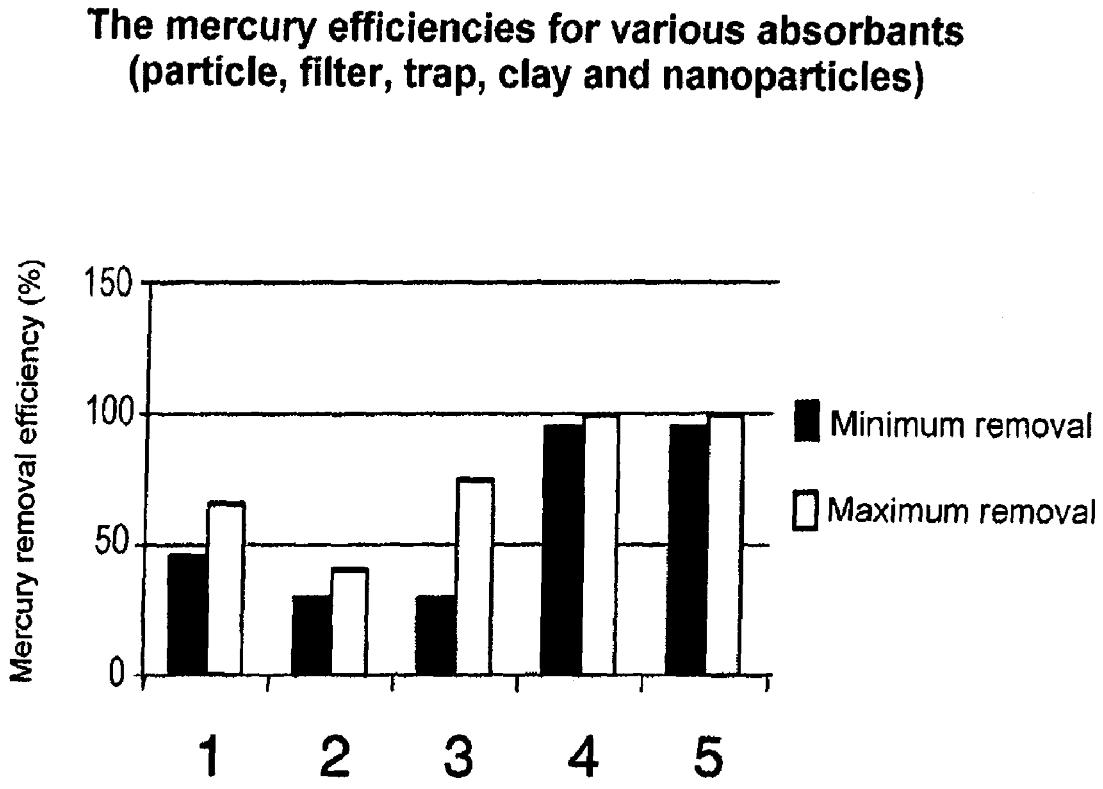
FIG. 12 illustrates mercury removal results using various sulfur-containing adsorbents.

Different types of sulfur-based adsorbents were employed at temperature ranges of 50-1300° C. to evaluate their efficiency for mercury removal from a hot fluid (air stream). Nanoparticles and marco/microparticles coating on filters, traps, particles and powders were deployed. In FIG. 12, the removal efficiency of mercury in percent (%) upon the exposure of an air flow rich in Hg in function of the following interfaces (1) elemental sulfur with montmorillonite clay, (2) elemental sulfur on activated carbon; (3) elemental sulfur trap, filters coated with mercaptopropyltrimethoxysilane (MPTMS), and (4) iron nanoparticles coated with sulfur containing compounds such as polysulfides (e.g., S4) are shown. It has been demonstrated that several sulfur adsorbing compounds can lead to substantial reduction of mercury. A control experiment was run without any interface and the results obtained demonstrate that no reduction or mercury was noted (after the walls were saturated). The control was run for all the four samples as well. For over 500° C., the cooling interface (turbulence cooling) was used and yielded near a complete mercury depletion. The results also demonstrate that gold nanoparticles are not the only one working as most of the other types of nanoparticles, filters, coating, grids, etc, can indeed uptake mercury if coated by sulfur or sulfur containing material as well. Again, at high temperatures, the adsorption efficiency decreases. The control experiments including the interfaces without the turbulence cooling system never exceeded 50% even considering the best types of interfaces from a wide range or nano-, micro- or macro-interfaces deployed in this study. However, when a turbulence cooling unit is used, the pollutant-containing hot fluid is cooled to temperatures lower than 60° C. which allow the nano/micro-adsorbent interfaces to work very efficiently. Furthermore, it was found that titanium oxides nanopartilces film and filters were very efficient although they require UV lights to be activated.

It is clearly apparent from these results that the technology of the present invention allows a complete removal of mercury in a fluid. The design herein suggested is an example that is versatile and can be tailored specifically for different applications.

Natural seasalt and sulfate particles, as described in Example 1(h) above, were also used as adsorbents for removing mercury. The mercury removal rates obtained were of about 50%. The results show that natural nanoparticles can be used to remove pollutants when isolated. Once again, the conditions used may also not have been optimal for this experiment.

c) $CO_2$ Adsorption Tests

Figure 13:
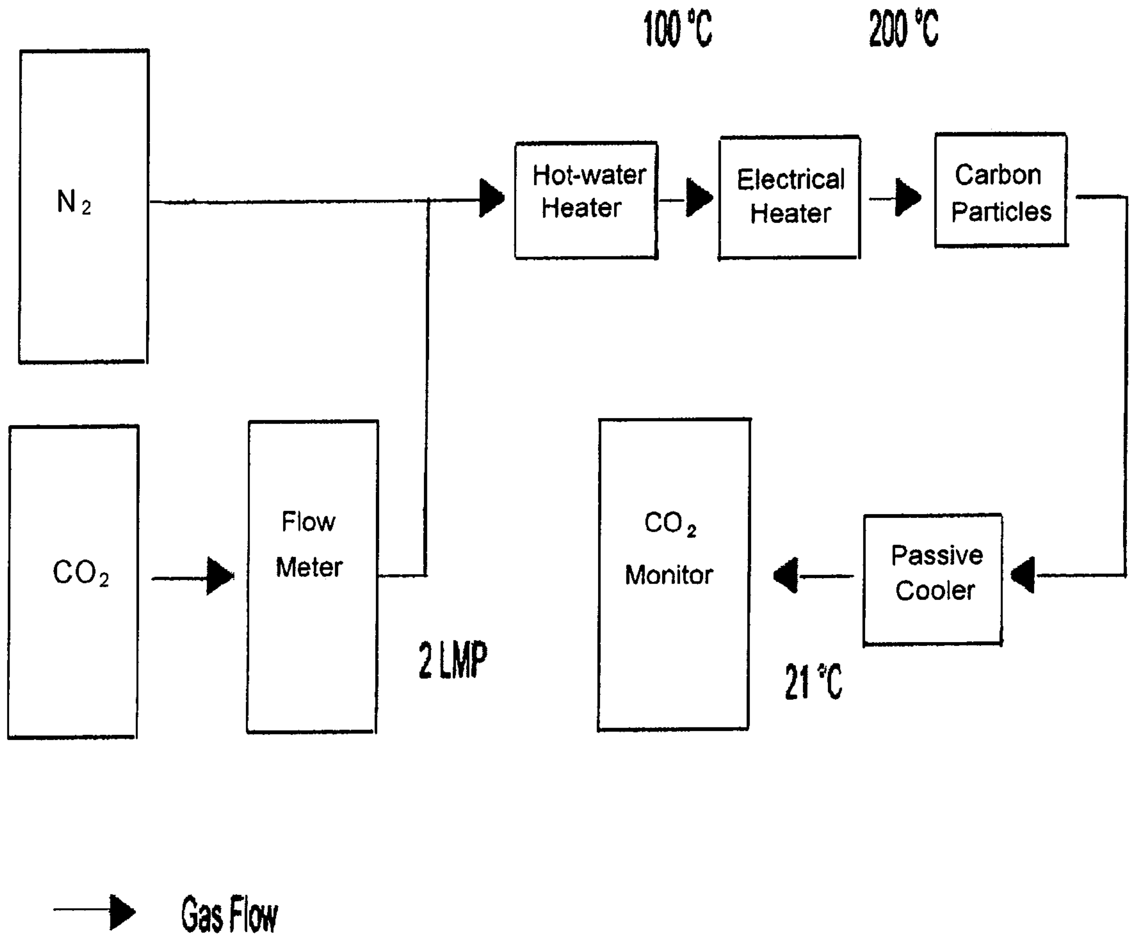
FIG. 13 is a schematic representation of a $CO_2$ removal process used in the present invention.

A system, as described in FIG. 13, was developed in order to mimic a setup at different controlled temperatures to evaluate whether the use of the turbulence cooling system of the present invention coupled with various adsorption interfaces (including alumina, fused silica, activated carbon) could remove carbon dioxide. Passive cooler shown in the FIG. 13 refers to turbulence cooling. This system is identical to the one described in FIG. 2(*a*). Using this setup, sufficient $CO_2$ reduction was obtained at temperatures over 100° C. using regular adsorbents (grids, filters, clays, thin film and particles including metal nanoparticles (e.g. Iron oxides)) not generally efficient at these temperature levels. Water inclusion was also used to improve $CO_2$ adsorption in selected adsorbents. Although FIG. 13 depicts the regular setup, additional experiments at different temperatures and different adsorbents yielded to efficient and significant $CO_2$ reduction. Factors such as surface availability, physical and chemical properties, water availability on active sites affects the $CO_2$ removal efficiency.

Figure 14A:
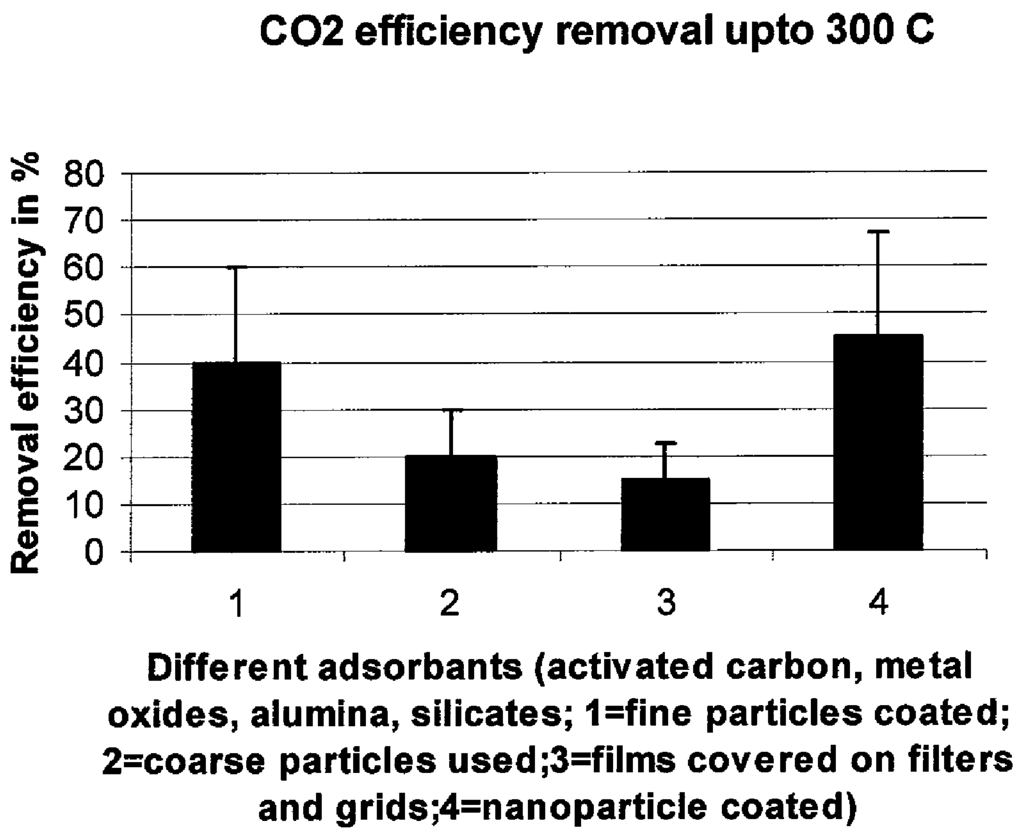
FIG. 14(*a*) illustrates $CO_2$ removal results for different adsorbents.
Figure 14B:
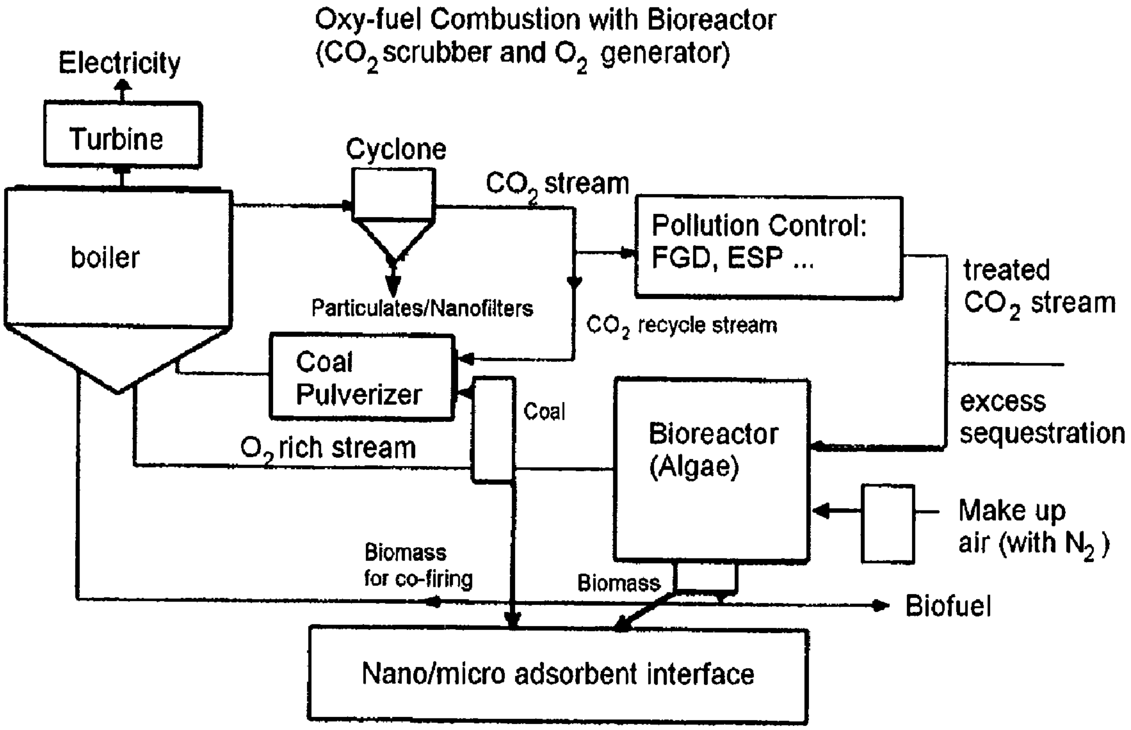

Results obtained in $CO_2$ removal are shown in FIG. 14(*a*) and demonstrate that the adsorption of carbon dioxide in presence of water (columns 1 and 4) is accelerating the deposition of $CO_2/HCO_3/H_2CO_3$ on the interfaces. Without addition of water (columns 2 and 3), the adsorption of $CO_2$ was always below 50% under the experimental conditions used. However, with water (columns 1 and 4), a higher uptake was observed. It is noted that the addition of water to $CO_2$ flow were done before entering the interface. A drier surface ($Al_2O_3$) was placed before the interface to avoid destroying the surfaces with water adsorption.

d) Use of Nano-, Micro- or Macroparticle Interfaces in Combination with Biological Remediation Techniques The nano-, micro- or macroparticle adsorbent interface can be also used prior to or after biological remediation techniques as, for example, bioreactors (algea). As the product of bioreactors are also volatile organic compounds, sulfur and nitrogen species, these interfaces will reduce the precursors of $CO_2$, and consequently the total $CO_2$ production (noting volatile and semivolatile organic compounds are oxidized to carbon dioxide). FIG. 14(*b*) shows that nano- or macro-interfaces can be coupled to the existing bioreactors that lead to a decrease in $CO_2$ emission. By coupling the nanoparticle/macroparticle interface that are well-placed within a series of size-aggregated filters, the nanoparticles will not be dispersed in the fluid flow and, at the same time, the organic compounds and biofilms that lead to $CO_2$ emission, which are formed as by-product of biological removal of $CO_2$, are also removed. In this way, the secondary generation of $CO_2$ emission is reduced. Depending on the bioreactor (types, size, operation condition), the efficiency can be varies. The turbulence cooling was used to adjust the optimize $CO_2$ removal.

e) Volatile Organic Compounds Adsorption Tests

Figure 15:
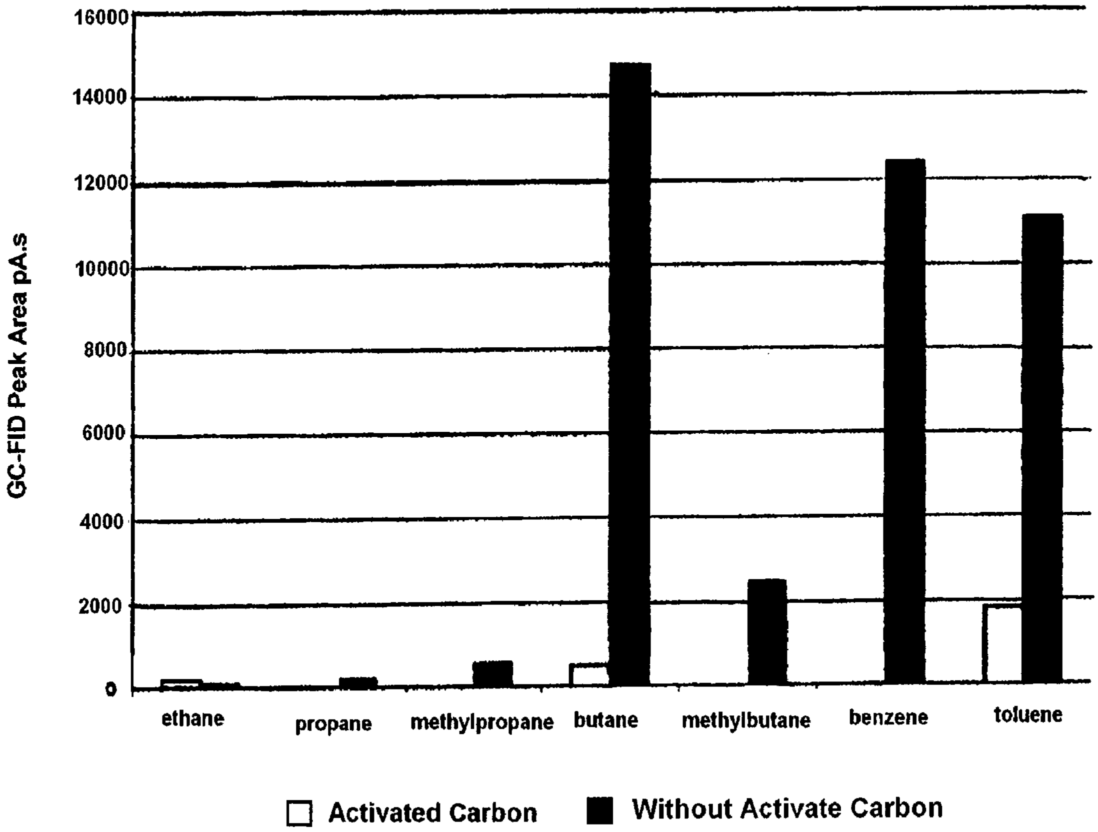
FIG. 15 illustrates the removal of volatile organic compounds (VOC) with activated carbon and metal oxides nanoparticles.

FIG. 15 shows results obtained for the adsorption of VOCs with and without activated carbon. This figure demonstrates that the adsorption significantly decreases many volatile organic compounds concentration. However, for the very small volatile organic compounds ethane and propane, adsorption is not effective at all due to the high volatility and less tendency for surface adsorption.

f) Volatile Organic Compounds Adsorption Tests with Photolysis

It has been found that it was advantageous to add a step of photolysis to the method of the present invention when the contaminant/pollutant was VOCs (volatile organic compounds). Without the step of photolysis, a large amount of light molecular weight VOCs was removed. However, the nano-adsorption can remove several light molecular weight VOCs as well. It has been observed that the increase in temperature decreases the adsorption. However, this drawback can be easily overcome by the use of the turbulence cooling system described herein.

Figure 16A:
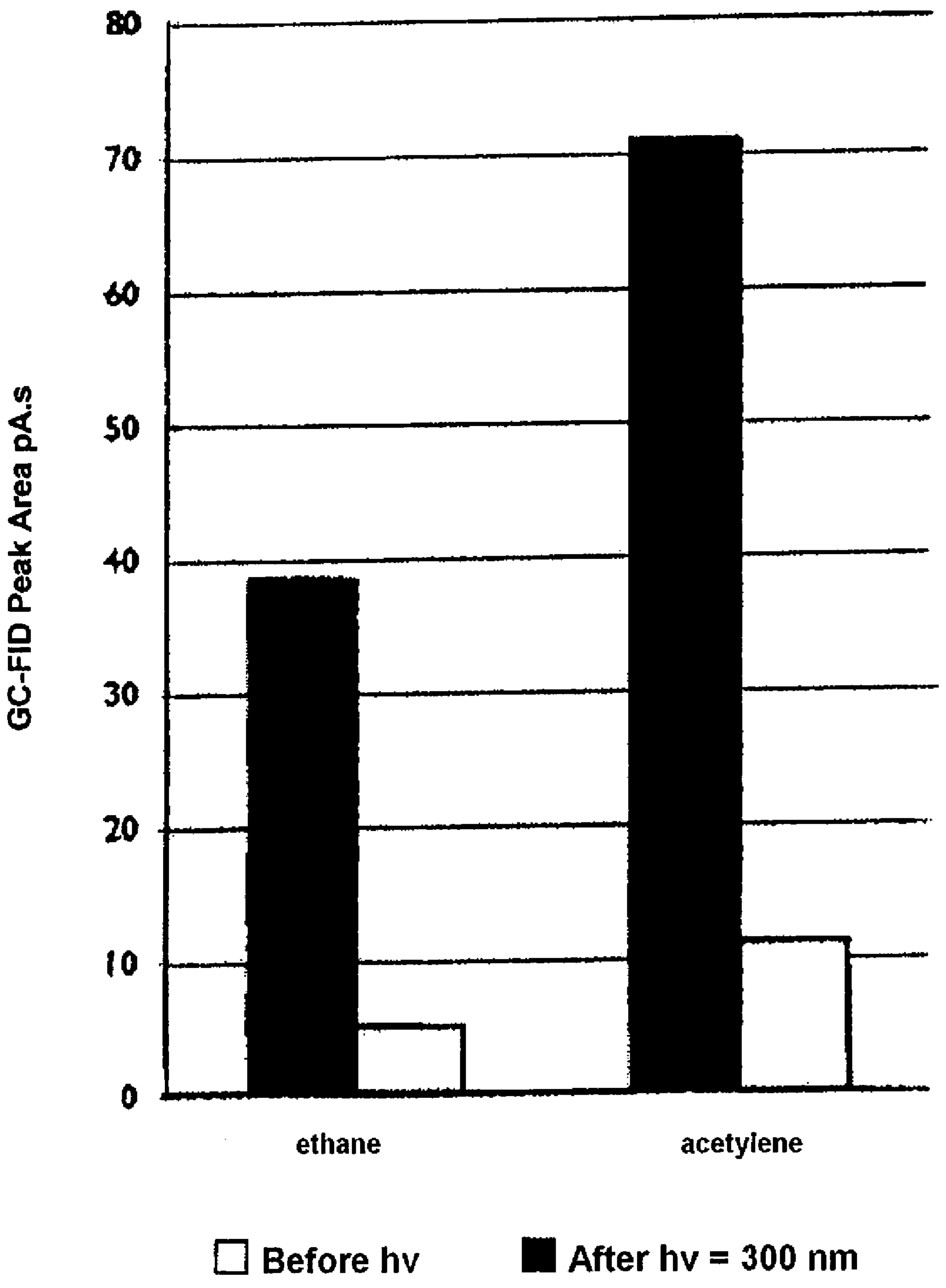
FIGS. 16(*a*) and (*b*) illustrates the difference in removal efficiency of VOC with and without photolysis.
Figure 16B:
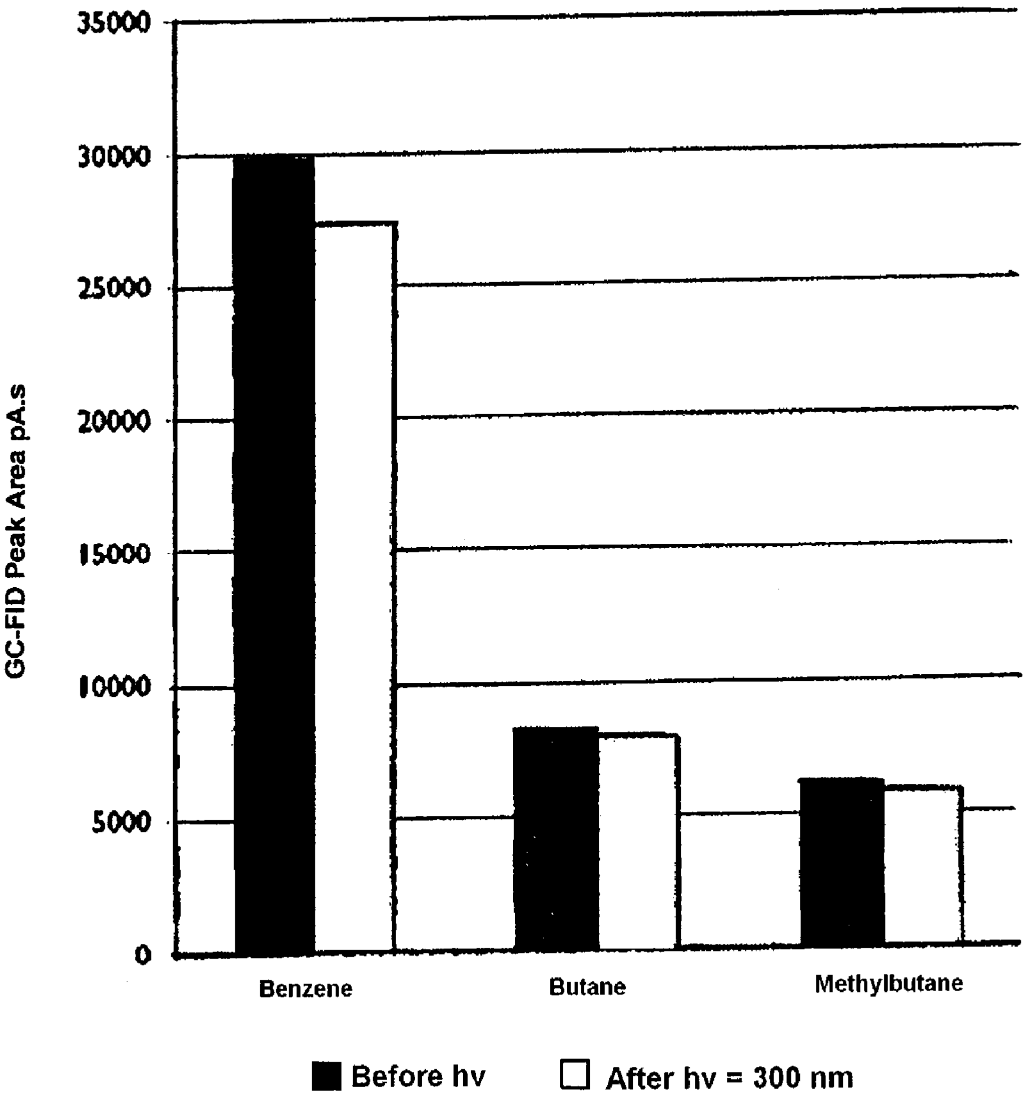

FIG. 16(*a*) indicates that after UV-photolysis, there is a significant decrease in the concentration of volatile organic compounds such as the low molecular weight (C2) ethan and acethylene. FIG. 16(*b*), however, depicts that there was a slight decrease for a group of volatile organic compounds such as benzene, butane and methyl butane. Again, these results support that, for very small organic compounds that d surfaces, photolysis is useful. Furthermore, depending on their adsorption cross section, one can optimize the removal of these low molecular weight compounds from an air flow rich in these pollutants.

Figure 17A:
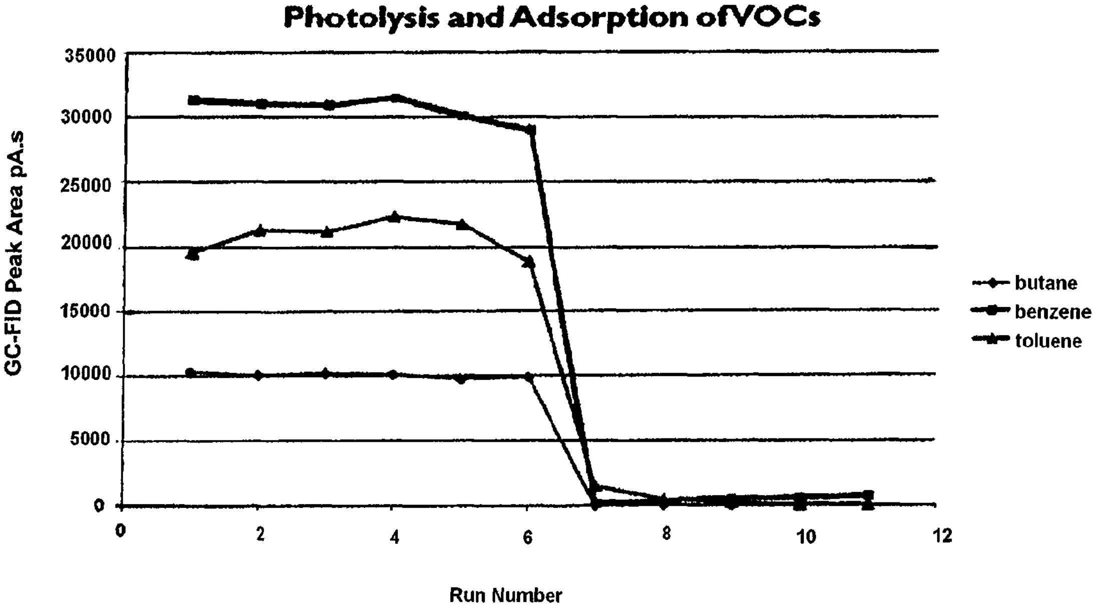
FIG. 17(*a*) illustrates the removal efficiency of VOC using photolysis and adsorption. The sharp decline starts when the photolysis and adsorbent interface are used. The high concentrations are observed in the absence of both the photolysis and adsorbent interface.
Figure 17B:
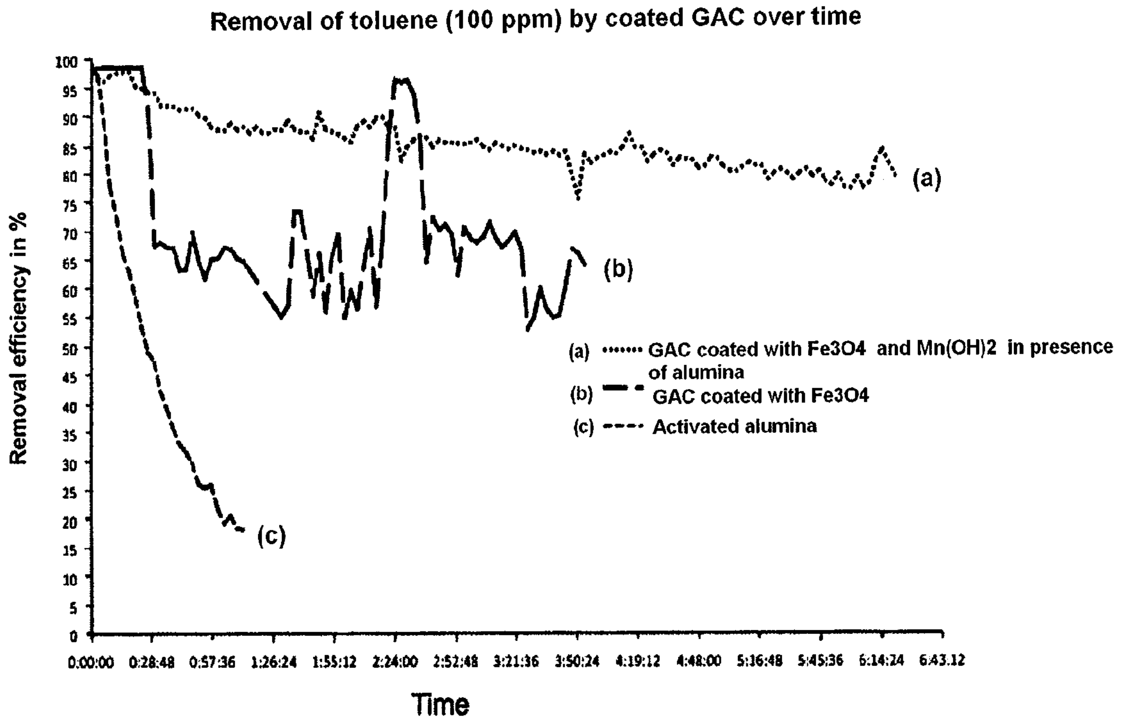

It is generally known that photolysis will lead to the formation of by-products that are themselves contaminant/pollutants. By performing the photolysis in conjunction with the use of an adsorbent, it allows the by-products to be adsorbed during the process, which is clearly advantageous over the previously known technologies involving photolysis alone. FIG. 17(*a*) indicates selected data for metal oxides nanoparticles and demonstrates that the combination of photolysis yield to near completion of several key volatile organic compounds such as benzene, toluene and n-butan. More particularly, FIG. 17(*a*) illustrates that the combination of adsorption and photolysis is very powerful for removal of volatile hydrocarbons. The sharp decline starts when the photolysis and adsorbent interface are used. The higher concentrations are control experiments in absence of adsorption interface and in the absence of photolysis. The results obtained clearly demonstrate that adding a step of photolysis improves greatly the yield of the removal of some pollutants in the fluid. Indeed, the sharp decline starts when the photolysis and adsorbent interface are combined.

Furthermore, the addition of several nano- and macroparticle coated surfaces in air-circulation filters and facial masks were tested to evaluate the efficiency of the removal of volatile and semi-volatile organic compounds. FIG. 17(*b*) shows the result of a model volatile organic compound (toluene). It shows that the coating of iron oxide nanoparticles, coated over graphite filters and beads (noted in FIG. 17(*b*) as GAC), exhibited a removal efficiency for toluene ppm 50% to near complete, depending upon the setup used. In contrast, for the control aluminum oxide, which is widely used as an adsorbent, the removal efficiency for a pollutant such as toluene was much lower. Indeed, within an hour it decreases to below 20% removal and towards the end of the observation its removal efficiency decreased below the detection limit, i.e., near zero percentage of toluene removal. The nano-adsorbent was shown to hold its efficiency, particularly in the case of (a) of above 80% during several hours of observation. It is noteworthy that similar results are observed using cellulose surfaces. Toluene was analyzed using gas-chromatography with flame ionization (GC/FID) and mass spectrometry detection techniques (GC/MS). It is clear from the shown data that by changing the interface, the format of coating, and mixture of nano-macroparticles, one can alter the efficiency to the desired application.

g) Aerosol and Bioaerosol Removal Techniques

Figure 18:
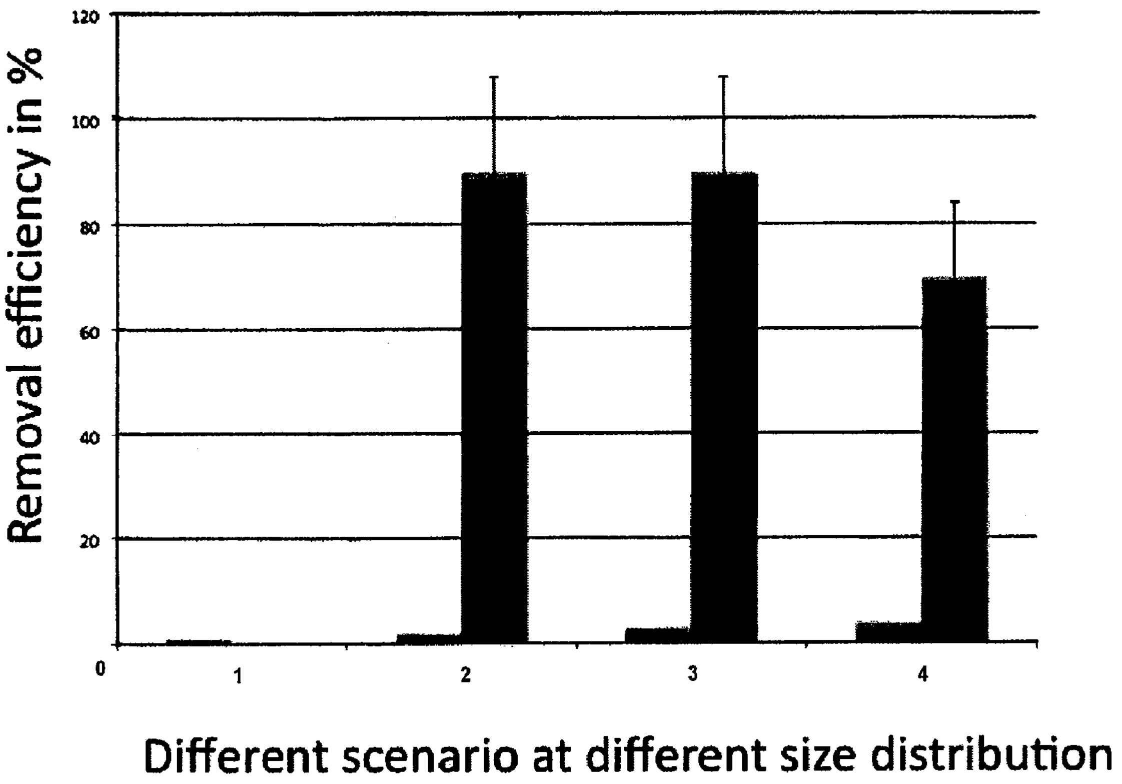
FIG. 18 illustrates aerosol removal efficiency while a given mixture of nanoparticles ($Fe_2O_3$, ZnO, CuO and crashed clay minerals) attached to cellulose and glass beads were placed in a tube closed by glass wool and deployed as an interface in the air stream.

Methodologies similar to VOC removal were adapted for aerosol removal using different coated disks and/or heterogeneously coated films/particles/grids/and filters using micro/macro and nanoparticles. Multiple interfaces were also tried to increase the efficiency. The flux temperature of approximately 500° C. was cooled to room temperature using turbulence cooling. Therefore, the adsorption process was not at elevated temperature. FIG. 18 illustrates an optimal setup (amongst many tested) for aerosol removal efficiency while a given mixture of nanoparticles ($Fe_2O_3$, ZnO, CuO and crashed minerals) attached to cellulose and glass beads were placed in a tube closed by glass wool and deployed as an interface in the air stream. The controls of this experiment are indicated with the letter "a". Scenario (1) of FIG. 18 represents a case in which no interface was used and air flow containing aerosols were detected directly. This first scenario is the control situation and all data were normalized to this data. In scenario (2), only particles larger than a micron were used. A 5 micron filter was used to separate the different size. The third scenario (3) depicts data collected when one filter was used. Finally, in the fourth scenario (4), 0.2 micron filters were used. Therefore, only nanoparticles could traverse the filter. It has been demonstrated that the use a heterogeneous setup enhances the separation of various aerosols size, over 70%, under conditions used in this study. Clearly, the efficiency of the method varies based on factors such as the availability of the surfaces, hygroscopic and hydrophobic properties, geometry and configuration of the surfaces based on the fundamental of chemical physics.

As shown in Table 1, multiple combinations of nano-particles were used to evaluate the impact on bioaerosols (herein focused on bacteria and fungi). This was tested in the air-circulation of buildings. Filters Whatman No. 1 were used for coating. Each filter was coated with 800 μl of tested sample. A 47 mm filter (<0.22 μm) was placed on the top of the Whatman No. 1 filter paper and the two filters were placed on a screen of an air ventilation unit in a room located in a 5-story industrial building, exposing directly to the air flow exchange unit (the turbulence cooling system). The filters were in place for 24 hours. The role of the second filter paper (<0.22 μm) was to capture any microorganism that had passed from the first Whatman No. 1 filter. The effectiveness of coated Whatman No. 1 filter in killing or inhibiting the microorganisms was examined by placing the second filter paper (<0.22 μm) on tryptic soy agar (TSA) or sabouraud dextrose agar (SDA) to monitor the growth of bacteria and fungi, respectively. Due to the nature of the existing experimental facilities, we only focused on characterization of fungi and bacteria and the determination of their number density (number of unit/per volume/per time; generally #/(L.t)). As both fungi and bacteria are considered as microorganisms in FIG. 19, the number of identified species was merged in order to represent the total identified micro-organisms. When no nano-filter were used, the number of bacteria and fungi remained maximal (no removal or 100% remaining), and thus the percentage of reduction was zero. However, by including the presence of nanoparticles at different ratios, we could remove nearly 80% of all identifiable bacteria and fungi.

The regular air-filters were considered as control (contain 100% of total microorganisms). The data defined in Table 1 are compared to the control, i.e. the regular air-filters. Since all different nano-micro-aerosols interfaces led to a decrease in number of bacteria and fungi, the efficiency of removal of bacterial and fungi, are shown as negative number. We have shown that selected heterogeneous (multi)nanoparticle combination yields a very high removal, and is significantly superior to the existing air filters and masks in the market.

TABLE 1

| # of Treatment | Tube # | Treatment on Whatman No. 1 filter | % Changes Bacteria (negative signs depict the percentage of reduction in number density) | % Changes Fungi (negative signs depict the percentage of reduction in number density) |
|---|---|---|---|---|
| 1 | 1-A | 2 TiO2 + 2 CuO + ZnO | −18 | −23 |
| 2 | 1-B | 2 TiO2 + 2 CuO + ZnO | −40 | −37 |
| 3 | 2-A | TiO2 + ZnO | −35 | −3 |
| 4 | 2-B | TiO2 + ZnO | −36 | −42 |
| 5 | 3-A | 2 CuO + 2 ZnO | −40 | 63 |
| 6 | 3-B | 2 CuO + 2 ZnO | −27 | −3 |
| 7 | 4-A | CuO + ZnO | −65 | −60 |
| 8 | 4-B | CuO + ZnO | −45 | −67 |
| 9 | 5-A | TiO2 + CuO + ZnO | −80 | −80 |
| 10 | 5-B | TiO2 + CuO + ZnO | −66 | −70 |
| 11 | 5-C | TiO2 + CuO + ZnO | −75 | −57 |
| 12 | 5-D | TiO2 + CuO + ZnO | −71 | −70 |
| 13 | Control (Indoor circulation filter for ventilation system; A regular facial mask for microbial removal) | No treatment | 100 | 100 |

Figure 19:
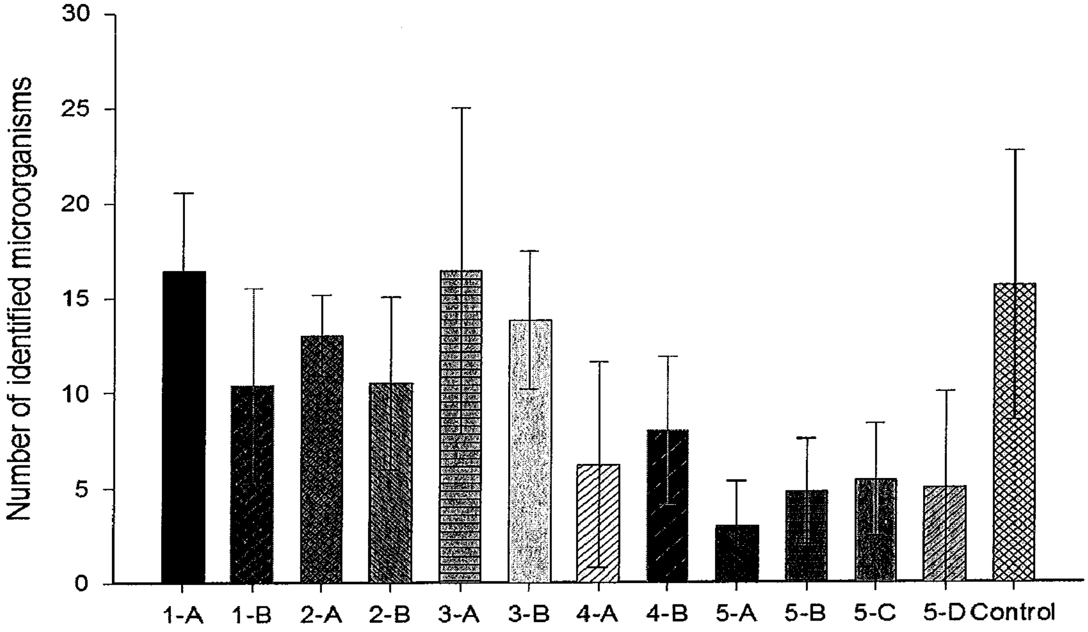
FIG. 19 illustrates the total number of microorganisms using various combinations shown in Table 1. The error bars include the variability between techniques and sampling and sample-to-sample variability. The average numbers are given in Table 1.

FIG. 19 shows the total of number of identified microorganisms using the treatments of nano-particles on the surface of filters and facial masks. Bioaerosol samplings were collected using conventional culture and bioaerosol sampling techniques. It is clear from the shown data that by changing the interface, the format of coating, and mixture of nano-macro particle, one can alter the efficiency to the desired application.Furthermore, the best setup (Table 1, treatment 5A) was used to coat cellulose beads with the mixture of nanoparticles. The beads were then placed inside the two types of facial masks used in medical field as well as antimicrobial masks for emergency situations. The indoor air flux with given bioaerosol number density was passed through the interface with treatment 5A. The air flux down stream of the facial filter contained about 80% less identifiable microorganism (data was 80%+/−10). The results indicate that both positioning mixed nanoparticles on (a) filters made of porous fibers such as cellulose can immobilize the movement of nanoparticles with the air flow, or on (b) structures such as beads coated with nanoparticles which avoid dispersion of nanoparticles in the air flow system can be used for the removal of microorganisms in an air stream indoor, outdoor or mobile units.

h) Electrochemistry for Regeneration

Figure 20A:
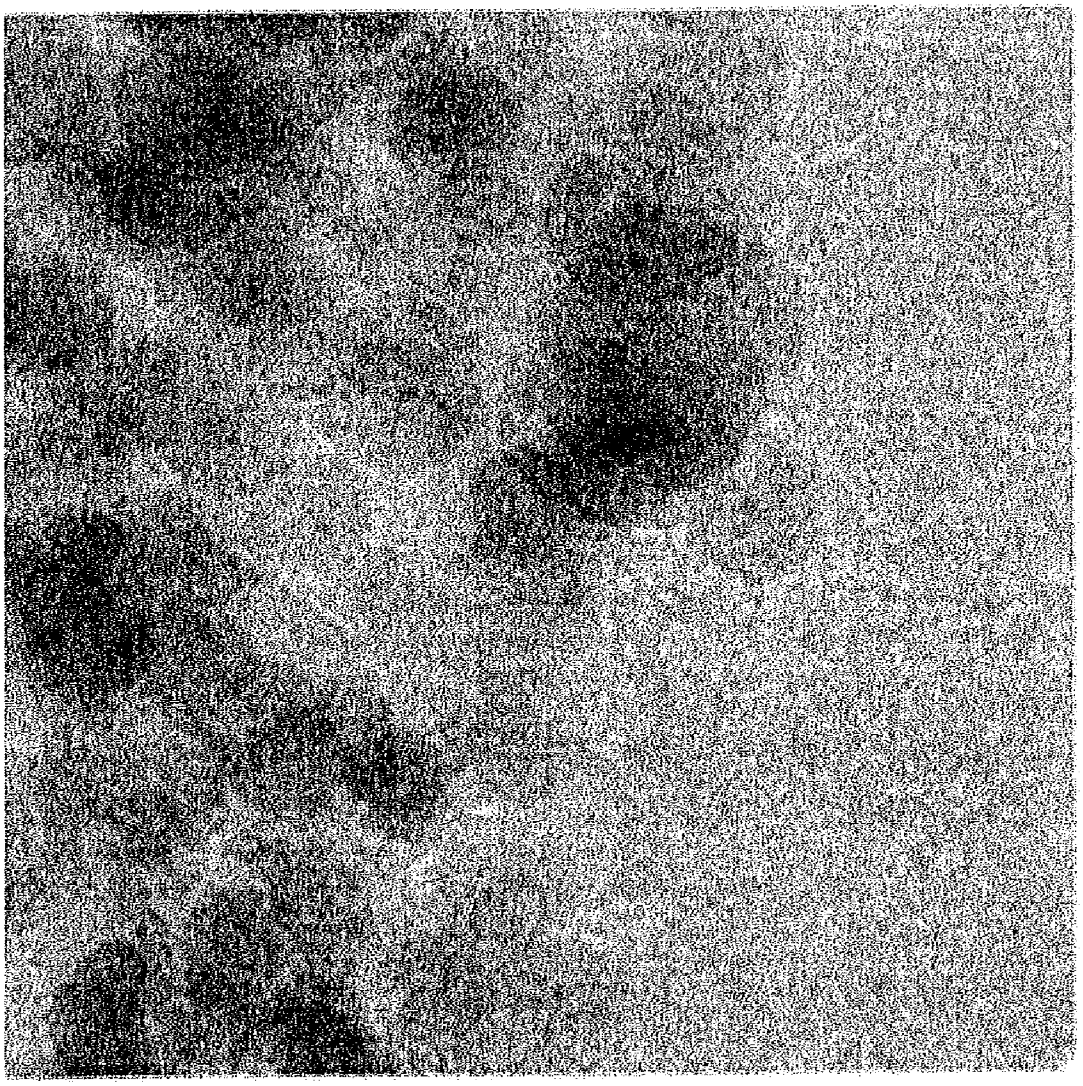
FIG. 20(*a*) is a transmission electron microscopy image of freshly prepared iron oxides particles.
Figure 20B:
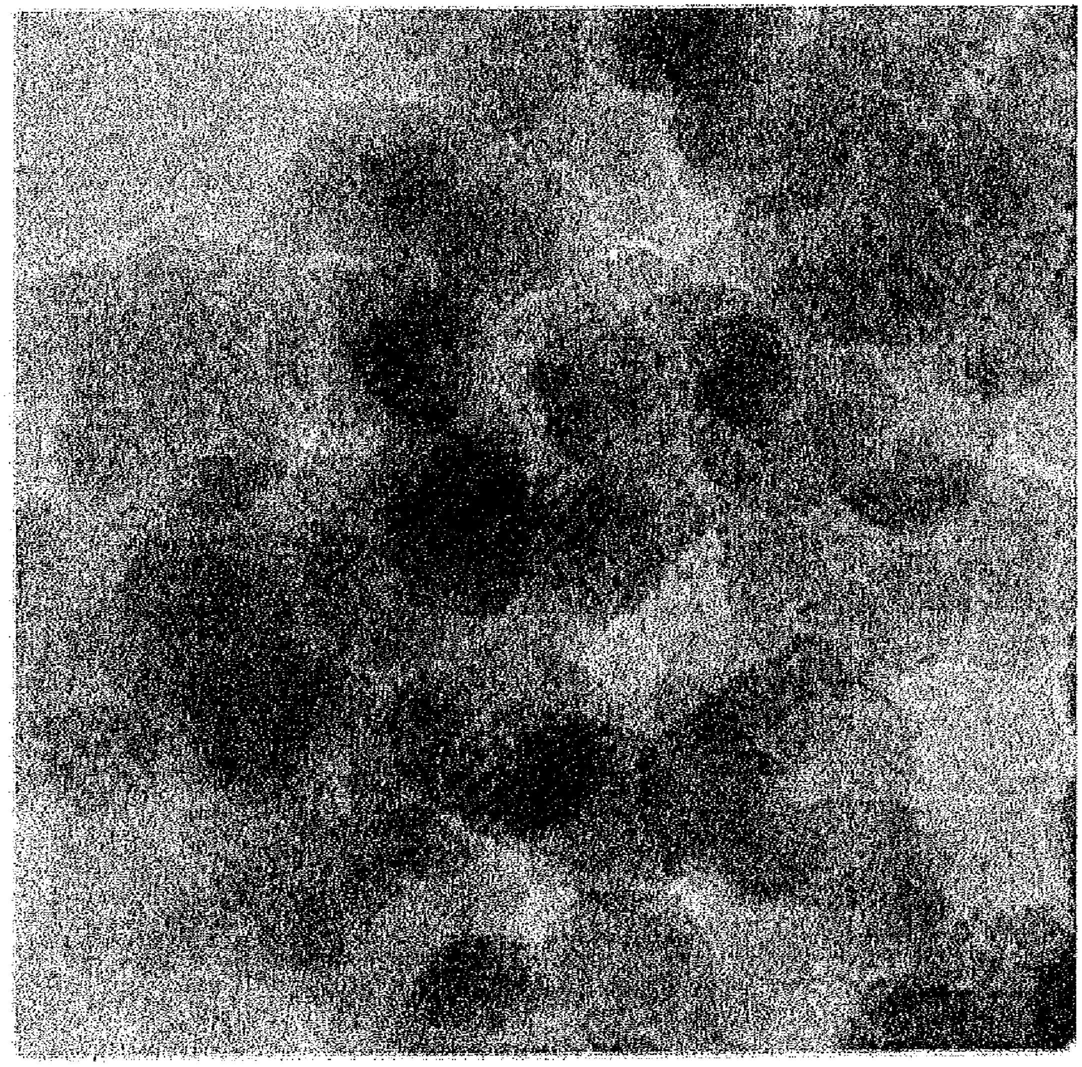

As shown in FIG. 1, electrochemistry (or the recovery or recycling unit) is a significant part of the system of the present invention as it allows the regeneration of the used adsorbents as well as the separation/purification of waste materials. For electrochemical regeneration of spent sorbent and subsequent mercury capture, an activated chlorine solution, created at the platinum anode from the NaCl electrolyte, converts adsorbed mercury to soluble oxidized forms as it passes through the spent sorbent. The dissolved mercury electroplates onto the stainless-steel cathode, where it may be recovered for recycling or disposal. The composition of the electrolyte solution may be altered to ensure sorbent stability, and iodine and bromine containing electrolytes were also tested and found very efficient. The modular characteristic of the electrochemical cell allows for the regeneration of a variety of forms of sorbent (e.g. columns of nanoparticles/microparticles, nanoparticle coated filters, etc.). Energy for the electrochemical recovery of mercury can be supplied from a power plant's operating capacity or, in the case of alternative installations of the recapture technology from renewable sources such as photovoltaic cells. Furthermore, the excess heat from the turbulence cooling device can be used for further cleaning of electrochemical waste. Once the electrochemical recovery of mercury has been verified, the entire mercury removal and recycling process was tested, from hot Hg-rich gas to Hg recovery on the stainless-steel cathode to determine mercury recovery efficiency. The recycled nanoparticles after reusage via the above-mentioned methodology (electrochemistry and/or thermal desorption) kept their size and crystal structure, as it is shown in FIGS. 20(*a*) and (*b*).

In summary, these Examples clearly demonstrate that the present invention provides a new method and system to adiabatically cool a hot fluid stream for enhancing the adsorption capacity of an adsorbent.

It should be appreciated that the invention is not limited to the particular embodiments described and illustrated therein but includes all modifications and variations falling within the scope of the invention as defined in the appended claims.

What is claimed is:

1. A method for adsorbing a contaminant or pollutant from a fluid, said method comprising the steps of:

a) mixing a cooling turbulent air flow from a turbulence cooling unit with said fluid to produce a mixed fluid containing the contaminant or pollutant; and b) adsorbing the contaminant or pollutant present in the mixed fluid by passing said mixed fluid through an adsorbent material adapted to form a complex, or chemically react with, or adsorb said contaminant or pollutant from said fluid.

2. The method of claim 1, wherein said fluid is a gas, a liquid or a multiphase.

3. The method of claim 2, wherein said method further comprises the step of recycling and recovering the contaminant or pollutant and the adsorbent material, wherein said adsorbent is rendered available for further use in the adsorption step.

4. The method of claim 3, wherein said recycling and recovering step comprises an electrochemical process, a desorption process or a thermal process.

5. The method of claim 4, wherein extra heat produced by the turbulence cooling unit is recycled as a source of energy for the recycling and recovering step.

6. The method of claim 1, wherein said contaminant or pollutant is selected from the group consisting of metals heavy metals, carbon monoxide, carbon dioxide, nitrogen oxides, volatile organic compound (VOC), ozone, and bioparticles.

7. The method of claim 1, wherein said adsorbent material comprises a plurality of nanoparticles, microparticles or macroparticles for adsorbing said contaminant or pollutant.

8. The method of claim 1, wherein said adsorbent material comprises particles of multiple nature for adsorbing more than one contaminant or pollutant.

9. The method of claim 1, wherein said adsorbent material comprises gold or goldcoated particles, iron oxide or iron-oxide coated magnetic particles, activated carbon powder or carbon powder coated particles, alumina or alumina coated particles, titanium dioxide or titanium dioxide coated particles, sulfur or sulfur coated particles, seasalt particles or sulfate particles.

10. The method of claim 1, wherein said contaminant or pollutant is a volatile organic compound and wherein the method further comprises a multi-stage photolysis step after the mixing step, wherein byproducts resulting from said photolysis step are adsorbed by said adsorbent material during step (b).

11. The method of claim 10, wherein said photolysis step is operated using renewable energy.

12. The method of claim 1, further comprising a contaminant or pollutant recovery step after the adsorption step.

13. The method of claim 1, wherein the adsorbent comprises a carbon material having macroparticles, microparticles or nanoparticles incorporated thereto, said macroparticles, microparticles or nanoparticles being made of, or covered with, a material adapted to form a compound or complex with said contaminants or pollutants.

14. The method of claim 13, wherein said carbon material comprises at least one of graphitized carbon fibers, graphitic flakes and graphitic fluoride fibers.

15. A depollution or decontamination system for adsorbing a pollutant or a contaminant from a pollutant- or contaminant-containing fluid, comprising:

a fluid input chamber having an inlet and an outlet, said fluid input chamber being adapted to receive and carry a fluid to be depolluted or decontaminated;

a turbulence flow chamber having an inlet and an outlet, and comprising a plurality of turbulators, said turbulence flow chamber being connected to the outlet of said fluid input chamber and adapted to generate a cool turbulent air flow;

a mixing zone positioned at a point of junction where the fluid to be depolluted or decontaminated is mixed with the cool turburlent air flow to produce a mixed pollutant- or contaminant-containing fluid; and a fluid output chamber comprising an adsorbent material; wherein said mixed pollutant- or contaminant-containing fluid passes through the adsorbent material of said fluid output chamber to be depolluted or decontaminated.

16. The depollution or decontamination system of claim 15, further comprising a plurality of drying agent cells.

17. The depollution or decontamination system of claim 15, wherein said system further comprises a photolysis device or system.

18. The depollution or decontamination system of claim 15, wherein said system further comprises a recycling and recovery device or system.

19. The depollution or decontamination system of claim 18, wherein the recycling and recovery device or system comprises an electrochemical cell or a thermal treatment connected to an output end of the fluid output chamber.

20. The depollution or decontamination system of claim 19, wherein electrochemical cell or the thermal treatment device or system uses excess heat generated by the turbulence cooling unit as an energy source.

21. The depollution or decontamination system of claim 15, wherein said system further comprises a detector for detecting an amount of pollutant or contaminant present in an output flow.

22. The method of claim 13, wherein the macroparticles, microparticles or nanoparticles are attached to a surface to avoid uncontrolled dispersion of the particles in the fluid.

* * * * *